(12) United States Patent
Pekrul et al.

(10) Patent No.: US 8,429,896 B2
(45) Date of Patent: Apr. 30, 2013

(54) ENGINE EXHAUST SYSTEMS WITH SECONDARY AIR INJECTION SYSTEMS

(75) Inventors: Eric Pekrul, Manitowoc, WI (US); Eric Hudak, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 859 days.

(21) Appl. No.: 11/734,072

(22) Filed: Apr. 11, 2007

(65) Prior Publication Data
US 2007/0240404 A1    Oct. 18, 2007

Related U.S. Application Data

(60) Provisional application No. 60/792,993, filed on Apr. 18, 2006.

(51) Int. Cl.
*F01N 3/00*    (2006.01)
(52) U.S. Cl.
USPC .................. 60/282; 60/274; 60/286; 60/288; 60/289; 60/293
(58) Field of Classification Search ............ 60/284–285, 60/273, 274, 289, 282
See application file for complete search history.

(56) References Cited

U.S. PATENT DOCUMENTS

| | | |
|---|---|---|
| 1,525,187 A | 2/1925 | Indlekofer |
| 2,154,593 A | 4/1939 | Way |
| 2,194,913 A * | 3/1940 | Rossi .............................. 60/597 |
| 2,263,318 A | 11/1941 | Tifft |
| 3,537,257 A | 11/1970 | Webster et al. |
| 3,716,996 A * | 2/1973 | Maruoka .......................... 60/286 |
| 3,732,696 A * | 5/1973 | Masaki ............. 60/274 |
| 3,750,634 A | 8/1973 | Nakajima et al. |
| 3,871,175 A | 3/1975 | Yamamoto |
| 3,927,523 A * | 12/1975 | Shioyama et al. .............. 60/278 |
| 3,949,719 A | 4/1976 | Bellanca et al. |
| 3,953,969 A | 5/1976 | Mori et al. |

(Continued)

FOREIGN PATENT DOCUMENTS

| | | |
|---|---|---|
| CN | 2081433 U | 7/1991 |
| CN | 2426019 Y | 4/2001 |

(Continued)

OTHER PUBLICATIONS

International Appln. No. PCT1US20071009299; Notification of Transmittal of the International Search Report and the Written Opinion of the International Searching Authority; Sep. 2007; 9 pages.

(Continued)

*Primary Examiner* — Thomas Denion
*Assistant Examiner* — Jesse Bogue
(74) *Attorney, Agent, or Firm* — Whyte Hirschboeck Dudek S.C.

(57) ABSTRACT

A variety of embodiments of exhaust systems for engines including small off-road engines, and related methods of operation, are disclosed. In at least some embodiments, the exhaust system includes a first conduit that receives exhaust emissions from a first engine cylinder, and a second conduit that communicates air to a first port on the first conduit. The air mixes with the exhaust emissions within the first conduit so as to produce a chemical reaction, and a level of at least one undesirable component of the exhaust emissions is reduced. Further, the exhaust system does not include any catalytic converter. In some embodiments, the exhaust system further comprises a crankcase ventilation system.

55 Claims, 12 Drawing Sheets

U.S. PATENT DOCUMENTS

| | | | |
|---|---|---|---|
| 4,002,136 A * | 1/1977 | Michalak | 440/89 R |
| 4,023,359 A * | 5/1977 | Masaki et al. | 60/277 |
| 4,027,478 A * | 6/1977 | Masaki et al. | 60/285 |
| 4,070,829 A * | 1/1978 | Yoshimura et al. | 60/290 |
| 4,084,373 A | 4/1978 | Hashimoto et al. | |
| 4,102,314 A | 7/1978 | Sarto | |
| 4,134,263 A * | 1/1979 | Matsumoto et al. | 60/293 |
| 4,162,613 A | 7/1979 | Tamura et al. | |
| 4,165,611 A * | 8/1979 | Ishikawa | 60/290 |
| 4,209,981 A * | 7/1980 | Miyamori et al. | 60/274 |
| 4,387,565 A | 6/1983 | Otani et al. | |
| 4,430,857 A | 2/1984 | Ikenoya et al. | |
| 4,434,615 A | 3/1984 | Ikenoya et al. | |
| 4,437,306 A | 3/1984 | Ikenoya et al. | |
| 4,864,825 A * | 9/1989 | Kakuta | 60/598 |
| 4,873,823 A | 10/1989 | Curths | |
| 4,916,898 A | 4/1990 | Gandhi et al. | |
| 4,958,613 A | 9/1990 | Hiraoka et al. | |
| 5,069,192 A | 12/1991 | Matsumoto et al. | |
| 5,301,504 A | 4/1994 | Bertling et al. | |
| 5,345,763 A | 9/1994 | Sato | |
| 5,657,628 A | 8/1997 | Takeuchi | |
| 5,755,095 A | 5/1998 | Maurer | |
| 5,761,904 A | 6/1998 | Nakayama | |
| 6,216,453 B1 | 4/2001 | Maurer | |
| 6,220,020 B1 | 4/2001 | Takahashi et al. | |
| 6,250,076 B1 | 6/2001 | Kawamata et al. | |
| 6,293,094 B1 | 9/2001 | Schmidt et al. | |
| 6,311,483 B1 | 11/2001 | Hori et al. | |
| 6,327,853 B1 | 12/2001 | Fujii et al. | |
| 6,382,197 B1 | 5/2002 | Matsumoto | |
| 6,711,894 B2 | 3/2004 | Bruenemann et al. | |
| 6,769,244 B2 | 8/2004 | Headley et al. | |
| 6,789,385 B2 | 9/2004 | Glover | |
| 6,834,497 B2 | 12/2004 | Miyoshi et al. | |
| 6,912,845 B2 * | 7/2005 | Hirooka | 60/285 |
| 6,918,245 B2 | 7/2005 | Hirooka et al. | |
| 6,945,201 B2 | 9/2005 | Taxon et al. | |
| 7,017,564 B2 | 3/2006 | Duprez et al. | |
| 7,028,463 B2 | 4/2006 | Hammond et al. | |
| 7,073,323 B2 | 7/2006 | Hirooka et al. | |
| 7,311,091 B2 | 12/2007 | Duprez | |
| 7,316,227 B2 | 1/2008 | Zhao et al. | |
| 2003/0070426 A1 | 4/2003 | Duffy | |
| 2004/0168440 A1 | 9/2004 | Tsuzuki et al. | |
| 2004/0177608 A1 | 9/2004 | Trapp | |
| 2005/0120711 A1 | 6/2005 | Koyama et al. | |
| 2005/0210866 A1 | 9/2005 | Ito et al. | |
| 2006/0021336 A1 | 2/2006 | Kokubo et al. | |
| 2006/0065255 A1 * | 3/2006 | Hirayama et al. | 123/585 |

FOREIGN PATENT DOCUMENTS

| | | |
|---|---|---|
| CN | 1375624 A | 10/2002 |
| CN | 1525054 A | 9/2004 |
| CN | 1796736 A | 7/2006 |
| DE | 3711101 A1 | 10/1987 |
| DE | 19816276 A1 | 10/1999 |
| EP | 0694680 A2 | 1/1996 |
| EP | 1277930 A1 | 7/2002 |
| EP | 2016261 B1 | 5/2011 |
| FR | 2288859 | 5/1976 |
| JP | 05139364 | 6/1993 |
| JP | 06050140 | 2/1994 |
| JP | 10141055 | 5/1998 |
| WO | 02064955 A1 | 8/2002 |

OTHER PUBLICATIONS

Filter Manufacturers Council, "Positive Crankcase Ventilation (PCV)"; Tech. Serv. Bul. 94-2R1; NC, USA; www.filtercouncil.org; May, 1995; 3 pages.

Emission Sub Systems—Positive Crankcase Ventilation System; Toyota Motor Sales, USA; 5 pages.; date unknown.

EP International Appl. No. 07755531.6; Official Communication; Mar. 8, 2010; 4 pages.

EP International Appl. No. 07755531.6; Official Communication; Mar. 20, 2010; 4 pages.

EP International Appl. No. 07755531.6; Official Communication; Oct. 12, 2009; 3 pages.

Emission Sub Systems—Positive Crankcase Ventilation System; Toyota Motor Sales, USA; 5 pages; admitted prior art.

Chinese Application No. 200780020867.1; First Office Action; Sep. 2010; 13 pages.

Chinese Application No. 200780020867.1; Second Office Action; Jan. 12, 2011; 8 pages.

Chinese Application No. 200780020867.1; Third Office Action; May 27, 2011; 18 pages.

Chinese Application No. 200780020867.1; Fourth Office Action; Dec. 14, 2011; 7 pages.

Mexican Application No. MX/a/2008/013395; Official Communication; Jun. 2011; 1 page.

Emission Sub Systems—Positive Crankcase Ventilation System; Toyota Motor Sales, USA; 5 pages; admitted prior art, Date: Jul. 23, 2003; as confirmed by http://web.archive.org/web/20030623031313/http://www.autoshop101.com/forms/h63.pdf.

* cited by examiner

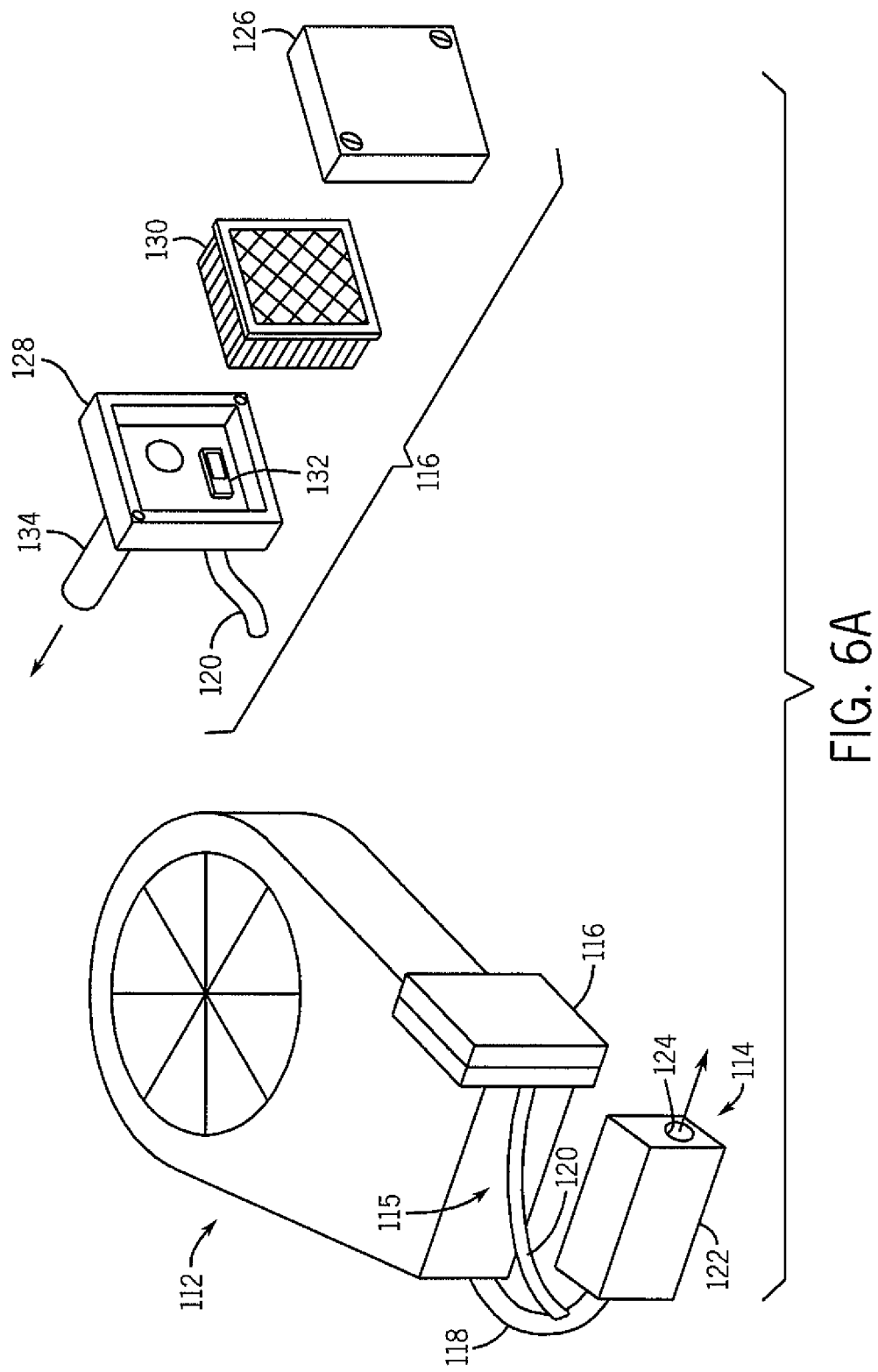

ENGINE EXHAUST SYSTEMS WITH SECONDARY AIR INJECTION SYSTEMS

CROSS-REFERENCE TO RELATED APPLICATIONS

This application claims priority to the U.S. Provisional Patent Application No. 60/792,993, filed Apr. 18, 2006, incorporated herein by reference.

FIELD OF THE INVENTION

The present invention relates to internal combustion engines and, more particularly, to exhaust systems in internal combustion engines.

BACKGROUND OF THE INVENTION

Internal combustion engines are used in a wide variety of applications. As a result of the internal combustion process, such engines necessarily generate exhaust emissions having a variety of carbon-based and other substances. Increasingly it desired that internal combustion engines be capable of operating in a manner such that at least one or more components of these exhaust emissions from the engines are reduced or eliminated.

Further, legislation has recently been (or is in the process of being) enacted in various jurisdictions such as California placing restrictions on the exhaust emissions of small off-road engines such as those employed in various small off-road vehicles and other small vehicles that are used to perform various functions in relation to the environment, for example, lawn mowers and snow blowers.

Catalytic converter technology is the most commonly implemented technology for processing exhaust emissions from internal combustion engines. In particular, catalytic converters and/or catalytic mufflers are now employed in most automobiles. Nevertheless, conventional catalytic converter technology has several disadvantages that make it not highly desirable, for use in many applications such as the above-mentioned small off-road engines.

In particular, catalytic converters tend to be fairly complicated and expensive due to their use of precious metal catalysts. Further, catalytic converters tend to lack durability and tend to deteriorate over time, both in terms of their substrates and metal catalysts as well as in terms of the wash coat applied to the precious metal catalysts, the latter being negatively impacted in particular by high temperature gases and lubrication-oil chemicals. Short periods of exposure to extreme thermal excursions during operation under "off-normal" conditions are also problematic in this regard.

Therefore, it would be advantageous if an improved system (or systems) could be developed for processing exhaust emissions produced by internal combustion engines including, for example, small off-road engines. Further, it would be advantageous if, in at least some embodiments, such improved system did not require the use of a catalytic converter, and was relatively inexpensive and more durable in comparison with conventional catalytic converters.

BRIEF SUMMARY OF THE INVENTION

The present inventor has recognized the above disadvantages associated with the use of catalytic converters and further recognized that, in many engines including, for example, small off-road engines, a variety of forms of exhaust systems including secondary air injection systems could be employed in place of catalytic converters.

In at least some embodiments, the present invention relates to an exhaust system for a small off-road engine. The exhaust system includes a first conduit that receives exhaust emissions from a first engine cylinder, and a second conduit that communicates air to a first port on the first conduit. The air mixes with the exhaust emissions within the first conduit so as to produce a chemical reaction, and a level of at least one undesirable component of the exhaust emissions is reduced. Additionally, the exhaust system does not include any catalytic converter.

Further, in at least some embodiments, the present invention relates to a small off-road engine that includes at least one cylinder and a first intake conduit by which an air-fuel mixture is provided from a throttle to the at least one cylinder. Additionally, the engine includes a first exhaust conduit that is coupled to the at least one cylinder to receive exhaust emissions therefrom, and a first secondary air injection conduit that is coupled to the exhaust conduit and by which air is communicated to the exhaust conduit so as to precipitate an exothermic oxidation reaction, whereby at least one undesired component of the exhaust emissions is reduced without any use of a catalytic converter.

Additionally, in at least some embodiments, the present invention relates to an exhaust system for reducing at least one exhaust emission component produced by an internal combustion engine. The exhaust system includes an exhaust conduit coupled at least indirectly to a cylinder of the internal combustion engine and receiving exhaust emissions therefrom. Further, the exhaust system includes at least one additional conduit coupled to the exhaust conduit at first and second orifices. Air is communicated via the at least one additional conduit into the exhaust conduit by way of the first and second orifices, and the addition of the air into the exhaust conduit results in an exothermic oxidation reaction that reduces the at least one exhaust emission component.

Also, in at least some embodiments, the present invention relates to an engine exhaust system that includes an exhaust conduit receiving exhaust emissions from an engine cylinder, a secondary air conduit providing air into the exhaust conduit by way of an orifice, and a muffler coupled to the exhaust conduit. A portion of the secondary air conduit at least one of surrounds and is integrated with at least a portion of the muffler such that the air provided into the exhaust conduit passes adjacent to the muffler prior to entry into the exhaust conduit and consequently the air is heated prior to the entry into the exhaust conduit.

Further, in at least some embodiments, the present invention relates to an internal combustion engine that includes a cylinder and an exhaust conduit coupled to the cylinder and receiving exhaust emissions from the cylinder. Additionally, the engine includes an air cleaner having an air filter, and a secondary air conduit coupling the air cleaner to an orifice on the exhaust conduit. The secondary air conduit receives air within the air cleaner at a location downstream of the air filter and communicates the air to the orifice, whereby the air is mixed with the exhaust emissions and, due to an exothermic oxidation reaction, results in a reduction in at least one component of the exhaust emissions.

Additionally, in at least some embodiments, the present invention relates to an internal combustion engine that includes a cylinder and an exhaust conduit coupled to the cylinder and receiving exhaust emissions from the cylinder. The engine further includes a blower housing, and a secondary air conduit coupling an inner region within the blower housing to an orifice on the exhaust conduit. The secondary air conduit receives air from the inner region and communicates the air to the orifice, whereby the air is mixed with the exhaust emissions and, due to an exothermic oxidation reaction, results in a reduction in at least one component of the exhaust emissions.

Further, in at least some embodiments, the present invention relates to a method of reducing a component of exhaust emissions from an internal combustion engine. The method includes providing air to a valve, and communicating the air past the valve when the valve is open. The method also includes directing the air through at least one orifice within an exhaust conduit of the engine, and mixing the air with the exhaust emissions flowing through the exhaust conduit, whereby a chemical reaction occurs resulting in the reducing of the component of the exhaust emissions.

In some embodiments, the invention relates to an exhaust system for a small off-road engine. The exhaust system comprises a first conduit that receives exhaust emissions from a first engine cylinder and a second conduit that communicates air to a first port on the first conduit a first valve assembly coupled to the second conduit. The valve assembly at least partially governs a flow of air through the second conduit and the valve assembly includes a passive one way reed valve. The air mixes with the exhaust emissions within the first conduit so as to produce a chemical reaction, wherein a level of at least one undesirable component that the exhaust emissions is reduced. The exhaust system does not include any catalytic converter.

Further, in some embodiments, the present invention relates to an exhaust system for a small off-road engine. The exhaust system comprises a first conduit that receives exhaust emissions from a first engine cylinder and a second conduit that communicates air to a first port on the first conduit. The air mixes with the exhaust emissions from the first conduit so as to produce a chemical reaction, wherein a level of at least one undesirable component of the exhaust emissions is reduced. The exhaust system does not include any catalytic converter. The second conduit provides communication between a crankcase of the engine and the first conduit.

In at least some embodiments the invention relates to an exhaust system for a small off-road engine that comprises at least one engine cylinder having a reciprocal piston moving therein and a crankcase. The exhaust comprises a first conduit that communicates intake air to the engine cylinder, a second conduit that receives exhaust emissions from the engine cylinder, a third conduit that communicates air from the first conduit to the engine crankcase, and a fourth conduit that communicates air and crankcase gases from the engine crankcase to the second conduit. The air mixes with the exhaust emissions within the third conduit so as to produce a chemical reaction, wherein a level of least one undesirable component that the exhaust emissions is reduced. The exhaust system does not include any catalytic converter.

BRIEF DESCRIPTION OF THE DRAWINGS

FIG. 6A is a top perspective view of an engine in which a passive secondary air injection system is combined with an air cleaner, the air cleaner further being shown in an exploded view, in accordance with at least some embodiments of the present invention;

DETAILED DESCRIPTION OF THE PREFERRED EMBODIMENT

The present invention relates to a variety of embodiments of exhaust systems for implementation in a variety of different internal combustion engines, where the exhaust systems are intended to reduce or even eliminate certain components of the exhaust emissions of the engines. Although several specific embodiments are described below with reference to the FIGS., it should be understood that the present invention is intended to encompass a variety of other embodiments of exhaust systems and related parts other than (or in combination with) the particular systems that are shown and described with reference to the FIGS.

Although the exhaust systems encompassed within the present invention are intended to be applicable to a wide variety of engines, the exhaust systems in particular are intended to be applicable to Class 1 and Class 2 small off-road engines such as those implemented in various machinery and vehicles, including, for example, lawn movers, snow mobiles and the like. In at least some such embodiments, the present invention is intended to be applicable to "non-road engines"

as defined in 40 C.F.R. §90.3, which states in pertinent part as follows: "Non-road engine means . . . any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

In at least some additional embodiments, the present invention applies to engines that have less than one liter in displacement, or engines that both have less than one liter in displacement and fit within the guidelines specified by the above-mentioned regulations. In still further embodiments, the present invention is intended to encompass other small engines, large spark ignition (LSI) engines, and/or other larger (mid-size or even large) engines.

Figure 1:
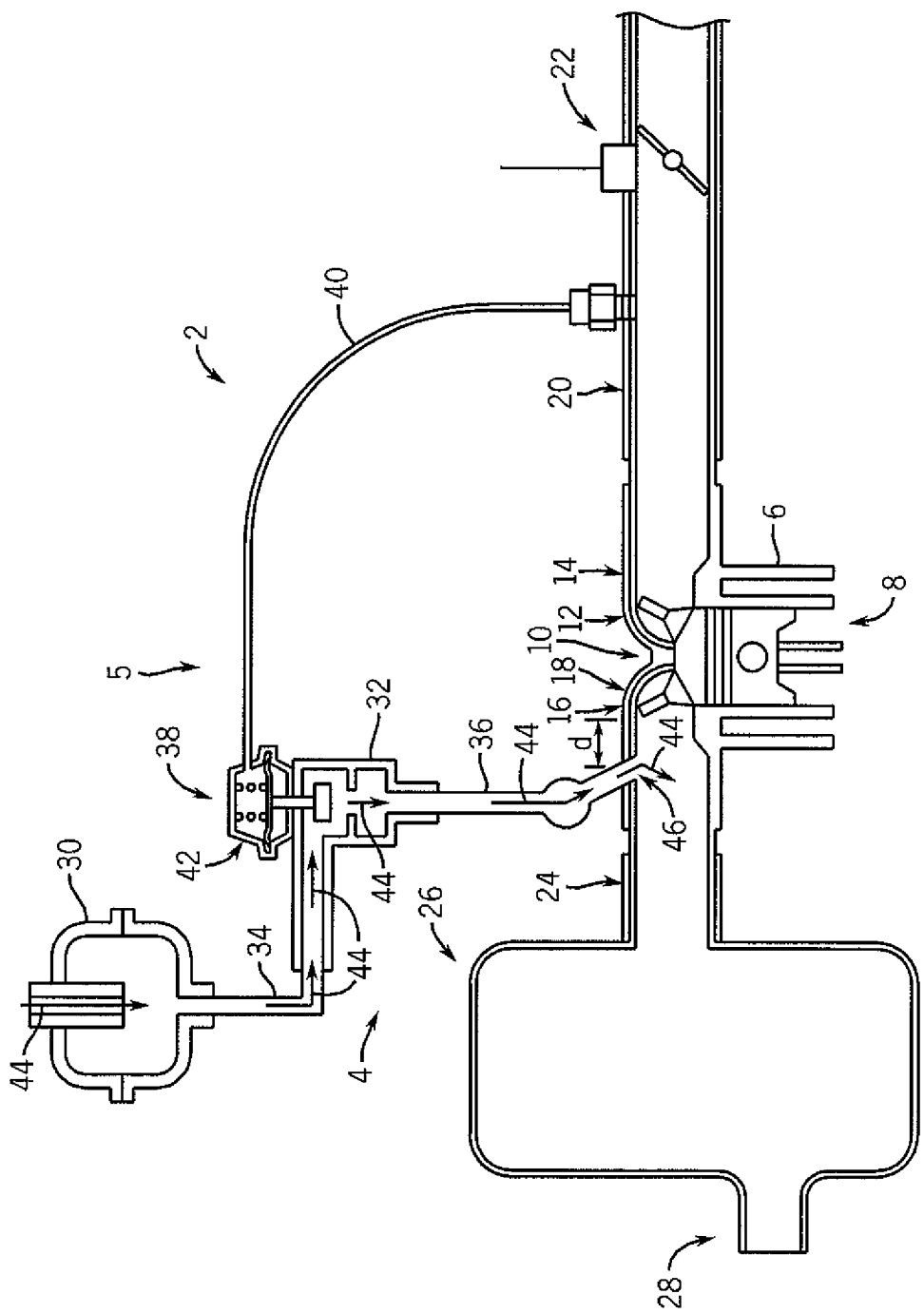
FIG. 1 is a schematic diagram of an engine employing a first exemplary exhaust system with a passive secondary air injection system in accordance with at least some embodiments of the present invention.

Referring to FIG. 1, a portion of a first engine 2 having a first embodiment of an exhaust system 4 is shown in schematic form. As shown, the engine 2 includes a cylinder 6 within which reciprocates a piston 8. Also included within the engine 2 is a cylinder head 10 that includes both an intake port 12 within which can open and close an intake valve 14 and an exhaust port 16 within which can open and close an exhaust valve 18. The intake port 12 is coupled to an intake conduit or manifold 20, along which is positioned a throttle 22 that governs a level of fuel/air mixture that is communicated via the intake manifold to the intake port and the cylinder 6. The exhaust port 16 is coupled to an exhaust conduit or manifold 24, which in turn is coupled to a muffler 26 that, in the present embodiment, is a thermal reactor muffler. Exhaust emissions that are produced during the combustion process occurring within the cylinder 6 are communicated out the exhaust port 16 (when the exhaust valve 18 is open), down the exhaust manifold 24 and into the muffler 26, and then subsequently output to the environment at an output port or outlet 28.

The exhaust system 4 of the engine 2 can be understood to encompass the exhaust manifold 24, muffler 26 and outlet 28, and even potentially be understood to include the exhaust port 16 and the exhaust valve 18. In contrast to many conventional engines, however, the exhaust system 4 does not include any catalytic converter. Rather, to reduce undesirable exhaust emission components such as hydrocarbons (HC) and carbon monoxide (CO) in particular, the exhaust system 4 includes several additional parts that form a secondary air injection (SAI) system 5. The SAI system 5 operates to provide additional oxygen to the exhaust system 4 to further complete an exothermic oxidation reaction in which engine out pollutants such as HC and CO are converted into carbon dioxide ($CO_2$) and water vapor before reaching the atmosphere by way of the outlet 28 (and also possibly to convert nitrogen oxides ($NO_x$) into nitrogen). With the secondary air injection system 5, the exhaust system 4 can be termed a secondary air injection (SAI) thermal reactor exhaust system, since secondary air is introduced to the exhaust gases downstream of the exhaust valve 18 into one or more locations along the exhaust manifold 24 or possibly proximate the exhaust port 16 or at the muffler 26.

More particularly, as shown in FIG. 1, the SAI system 5 includes several parts that allow for the introduction of secondary air/oxygen into the exhaust manifold 24. These additional parts include a resonator 30 that receives air from an air supply (not shown), a control valve assembly 32, and first and second secondary air conduits 34 and 36, respectively. The first secondary air conduit 34 links the resonator 30 with the control valve assembly 32 and the second secondary air conduit 36 links the control valve assembly 32 with the exhaust manifold 24. In the embodiment of FIG. 1, the air supply "not shown" is an air supply by which air is drawn into the resonator 30; that is, the air supply is merely an orifice or conduit by which the resonator 30 is able to draw in air from the atmosphere around the engine. In other embodiments, and as will be described in further detail with reference to FIGS. 6A-6B, the air supply can alternately be an additional component by which filtered air is drawn from the atmosphere, for example, an air cleaner. In yet further additional embodiments, the air supply can be a device that actively drives in air such as, for example, a blower (and blower housing) as described with reference to FIGS. 7A-7B or an air pump as described with respect to FIG. 9. Thus, while FIG. 1 is intended to show an embodiment in which air is drawn into the exhaust manifold 24 by way of the resonator 30, conduits 34, 36 and control valve assembly 32 in a passive manner, in other embodiments the air can be actively driven into the exhaust manifold.

Further as shown, the control valve assembly 32 in the present embodiment includes a spring-biased valve actuator 38 that is controlled by way of a vacuum pressure applied within the valve assembly. The vacuum pressure is applied by way of a vacuum line 40 that links a vacuum chamber 42 within the valve assembly 38 to the intake manifold 20, typically at a location in between the intake port 12 and the throttle 22 as shown. In the present embodiment, the spring-biased valve actuator 38 is configured so that the control valve assembly 32 tends to close when the throttle 22 allows for a maximum air flow to proceed toward the cylinder 6, and tends to open when the throttle 22 is positioned so that minimal amounts of air flow are sent to the cylinder (or the air is entirely shut off). Although shown in this manner, in alternate embodiments the control valve assembly 32 can be configured to operate in a different manner and even possibly in an opposite manner to that shown in FIG. 1. In particular, in at least some embodiments, the valve assembly 32 would be configured to close only when the throttle 22 was actuated to produce very high vacuums within the cylinder 6, e.g., under circumstances in which there were low loads and/or there was deceleration of the engine.

The SAI exhaust system 4 of FIG. 1 operates as follows. As the engine 2 operates, combustion occurs within the cylinder 6 and exhaust gases are sent via the exhaust port 16 toward the muffler 26. While this is occurring, assuming that the control valve assembly 32 was open due to operation of the spring-biased valve actuator 38, air is pulled/sucked from the air supply through the resonator 30, through the first conduit 34, through the control valve assembly and through the second secondary air conduit 36 and into the exhaust manifold 24. The sucking of air into the exhaust manifold 24 is not constant, but rather varies with time as the exhaust valve 18 opens and closes. During low exhaust pressure, air tends to flow within the SAI system 5 and be injected into the exhaust manifold 24 along the path indicated by arrows 44.

Additionally, the lengths and cross-sectional areas of the conduits 34, 36 (in combination with the length through the control valve assembly 32) and dimensions of the resonator 30 are preferably set to reduce or eliminate the presence of standing waves within the conduits 34, 36 that might inhibit the flow of air along the direction indicated by the arrows 44. In at least some embodiments, the resonator 30 can be considered as being formed simply by the existence of the conduits 34, 36 (or other components involved in providing secondary air to the exhaust manifold 24) and there need not be a separate structure forming a resonator. That is, the resonator 30 shown in FIG. 1 (and others of the FIGS.) can be considered, depending upon the embodiment, as representing an actual discrete cavity component or, alternately, representing symbolically the cavity within the exhaust system (e.g., a specific volume) by which the secondary air is communicated to the exhaust manifold. In embodiments that actually employ a physical resonator device, the location of the resonator device need not be one of those shown in the FIGS.; rather, a given physical resonator device could potentially be located at a variety of locations along the overall path by which secondary air is supplied to the exhaust manifold.

Further as shown, a distance "d" between the exhaust port 16 and an orifice 46 (e.g., as measured with respect to the center of the orifice) at which the second secondary air conduit 36 interfaces the exhaust port 24 is preferably set to maximize the effect of the secondary air being introduced into the exhaust manifold 24 in terms of furthering the exothermic oxidation reaction to reduce the levels of undesirable components of the exhaust emissions. The particular distance d can vary depending on the embodiment and, preferably, at least two considerations are involved in terms of setting the distance. On the one hand, the orifice 46 should be close enough to the exhaust port 16 such that the exhaust passing by the orifice 46 is still relatively hot. On the other hand, the orifice 46 should be located in relation to the exhaust port 16 so that the air being introduced by way of the second secondary air conduit 36, which is typically considerably cooler than the temperature of the exhaust coming from the exhaust port, does not overly cool the exhaust gases so as to quench the combustive reactions. That is, even though preferably as much secondary air as possible will be introduced as fast as possible to the exhaust gases coming from the exhaust port 16, there should be a balance between providing as much air as close to the exhaust port as possible and not providing excessive air that would overly suppress or squelch the combustive reactions that take place when the air is being introduced.

As mentioned above, the air that is introduced by way of the secondary air conduit 36 allows for the combustion of exhaust emission components such as additional HCs and CO so as to result in $CO_2$ and water vapor, and also can provide some reduction in oxides of nitrogen ($NO_x$), by way of cooling the combustion chamber or chemical kinetics in the exhaust system. Further, the secondary air can help to cool the exhaust port 16, the exhaust valve 18 and adjacent high thermal stress areas of the cylinder head 10. In contrast to many conventional engines, the presently-described engine 2 with the SAI exhaust system 4 achieves reduced levels of undesirable exhaust emissions without the need for any catalytic converter using precious metal catalysts. Rather the SAI exhaust system 4 using only secondary air injection and a high thermal gradient, through appropriate placement of the air injection (e.g., the placement of the orifice 46) within that gradient, can be used to control emissions and also to influence exhaust temperatures. In contrast to conventional exhaust systems employing catalytic converters, the presently described system can be implemented at a lower cost, does not have as high of a deterioration factor, can be more easily packaged, and has less difficulty functioning notwithstanding severe thermal excursions under "off-normal" operational conditions.

Figure 2:
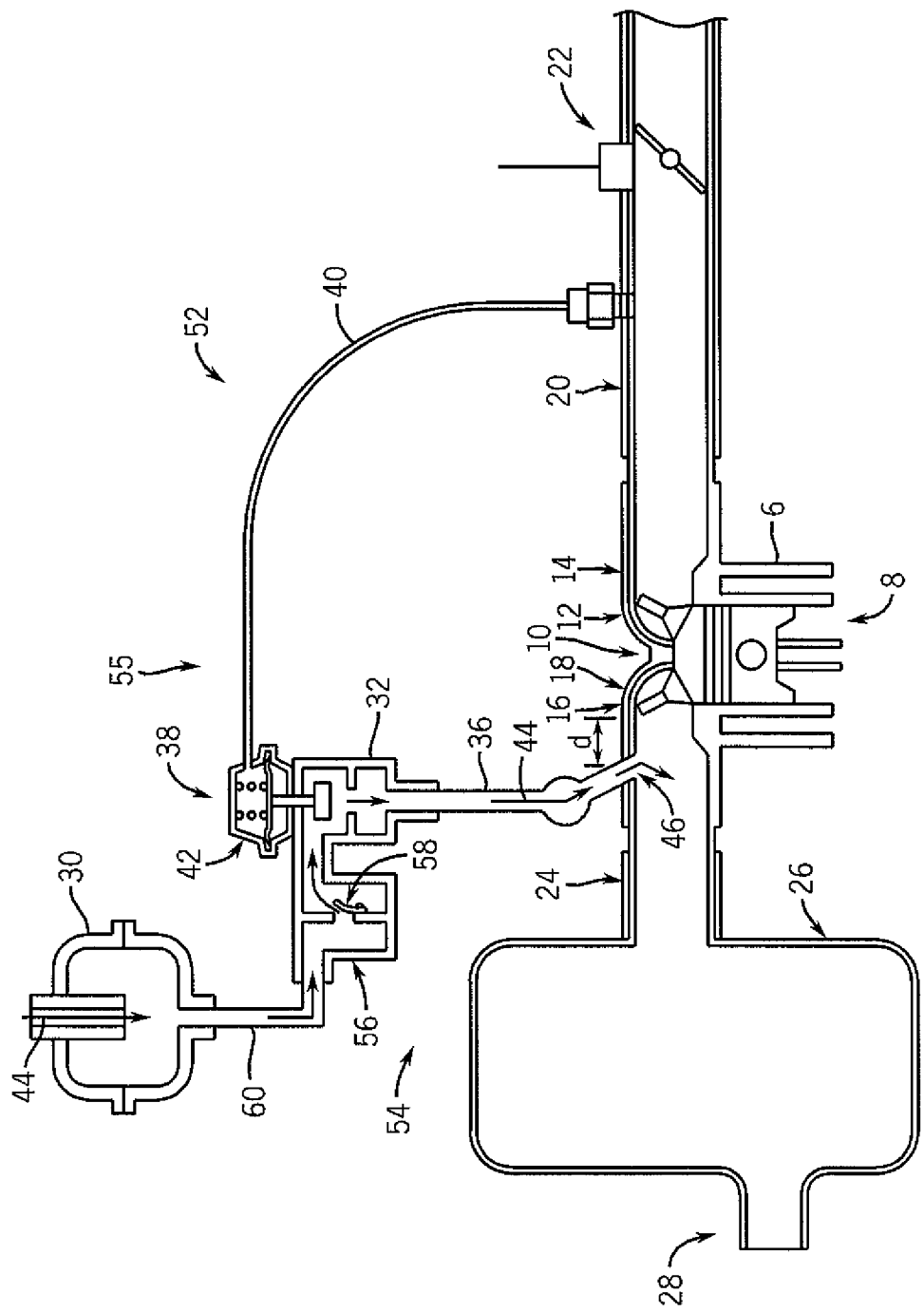
FIG. 2 is a schematic diagram of an engine employing a second exemplary exhaust system with a passive secondary air injection system that includes a one-way valve, in accordance with at least some embodiments of the present invention.

Turning to FIG. 2, a portion of a second engine 52 having a second embodiment of an exhaust system 54 is shown. As with the engine 2 of FIG. 1, the engine 52 includes the cylinder 6, piston 8, cylinder head 10, intake port 12, intake valve 14, exhaust port 16, exhaust valve 18, intake manifold 20, throttle 22, exhaust manifold 24, muffler 26, and exhaust outlet 28. The exhaust system 54 of the engine 52 in particular also is a SAI thermal reactor exhaust system having a SAI system 55 that, like the SAI system 5, includes the resonator 30, the control valve assembly 32 with valve actuator 38 and vacuum chamber 42, the vacuum line 40, and the second secondary air conduit 36 with orifice 46 being positioned at a distance d from the exhaust port 16. In contrast to the SAI system 5 of FIG. 1, however, the SAI system 55 includes not only the control valve assembly 32, but also includes a second, one-way valve assembly 56 including a one-way valve member 58 that allows air flow to occur in only one direction through the valve assembly. The one-way valve assembly 56 is coupled upstream (or, in alternate embodiments, downstream) of the control valve assembly 32, between the control valve assembly and a first secondary air conduit 60 by which the resonator 30 provides air to the one-way valve assembly 56.

The one-way valve assembly 56 can take a variety of forms depending upon the embodiment. In the embodiment shown in FIG. 2, the one-way valve member 58 is a reed valve member and the one-way valve assembly 56 is a passive air injection reed (PAIR) valve. However, in alternate embodiments, other types of one-way valve assemblies/valves can be employed including, for example, a ball valve, an umbrella valve, or other similar passive one-way valves. Through the use of the one-way valve assembly 56, the air flow indicated by arrows 44 from the air supply through the resonator 30, the conduits 60, 36, and the valve assemblies 56, 32 proceeds only in one direction, that is, toward the exhaust manifold 24, and does not ever flow in the reverse direction. Air in particular tends to flow in the direction indicted by the arrows 44 when pressure within the exhaust manifold 24 is low, such that air is drawn in. The exhaust system 54 also is particularly advantageous insofar as it is designed to be self-regulating in regards to exhaust gas temperature rise. More particularly, the SAI system 55 throttles itself as the thermal load on the exhaust system 54 is increasing, thus keeping excessive exhaust gas temperatures from occurring. Dynamic (pulsed) exhaust energy is allowed to aspirate air into the exhaust system.

In some embodiments using pulsed (reed) secondary air injection to the exhaust, the flow of the secondary air may be a function of a number of variables including reed geometry, stiffness, and pre-load. In some particular embodiments, the reed geometry will have a length ranging from about 20 mm to about 50 mm, a width ranging from about 10 mm to about 20 mm, and a thickness ranging from about 0.05 mm to about 0.3 mm.

In some embodiments using the pulsed (reed) SAT, lower exhaust back pressures can be beneficial. In some embodiments the muffler back pressure ranges from about 22.1 to about 62 inches of water at the rated power. In other embodiments, the muffler back pressure ranges from about 25 to 45 inches of water at the rated power. Such back pressure ranges can be achieved with volume ratios, VR, (muffler volume/cylinder displacement) ranging from about 3 to about 10, in some embodiments ranging from about 3.5 to about 7.0. In some embodiments, the muffler back pressure is a function of the volume ratio as shown in Formula 1.

$$BP = 5.7 VR + 5, \tag{1}$$

where BP is the muffler back pressure in inches of water.

The muffler back pressure can be used to control the secondary air injection system wherein increasing back pressure serves to throttle down the secondary air injection system.

This can help limit thermal load of the exhaust and the thermal reactor as power goes up. Generally, increasing power increases the thermal load on the exhaust system. On the other hand, increasing power increases the back pressure of the exhaust system. The increasing back pressure of the exhaust system decreases the flow through the secondary air injection system which in turn decreases the thermal load in the exhaust reactor. In some embodiments, the SAI air flow rate is 90+/−30 liters per minute at a pressure differential of 300 mm of water.

When using the pulsed (reed) secondary air injection system, the injection location for the secondary air injector should be located as close to the cylinder head and valve seat as practical while being downstream of the inner radius at the first bend in the exhaust port manifold. In such embodiments, the dimensions of the SAI piping typically are a length of greater than about 0 to about 550 mm and an internal diameter of about 9.5 to about 13 mm.

As with respect to the embodiment of FIG. 1, the location of the orifice 46 in FIG. 2 at which the injection of the secondary air occurs, as well as the geometric dimensions of the conduits 60, 36 and of the resonator 30, can vary depending upon the embodiment, typically with the goals of improving the exothermic oxidation reaction that occurs in the exhaust manifold 24 due to the injection of the secondary air and at the same time not squelching the reaction due to over-supplying secondary air. Also as in the case of FIG. 1 the exhaust system 54 in contrast to conventional exhaust systems does not include any catalytic converter although, in at least some alternate embodiments, a catalytic converter could also be employed. Further, although in the embodiment of FIG. 2 it is envisioned that air will be supplied to the resonator 30 in a passive manner, in alternate embodiments the air can be supplied in a different (e.g., active) manner as described with respect to FIG. 1. Further, while in the embodiment of FIG. 2 the control valve assembly 32 is located downstream of the one-way valve assembly 56, in alternate embodiments the order can be reversed. Preferably, albeit not necessarily, embodiments of the present invention either will have an active air supply (e.g., a pump or fan such as that discussed with respect to FIGS. 7A-7B) or will have a one-way valve member/assembly, or both, such that air tends to flow toward the exhaust manifold and not away from the exhaust manifold.

Figure 3:
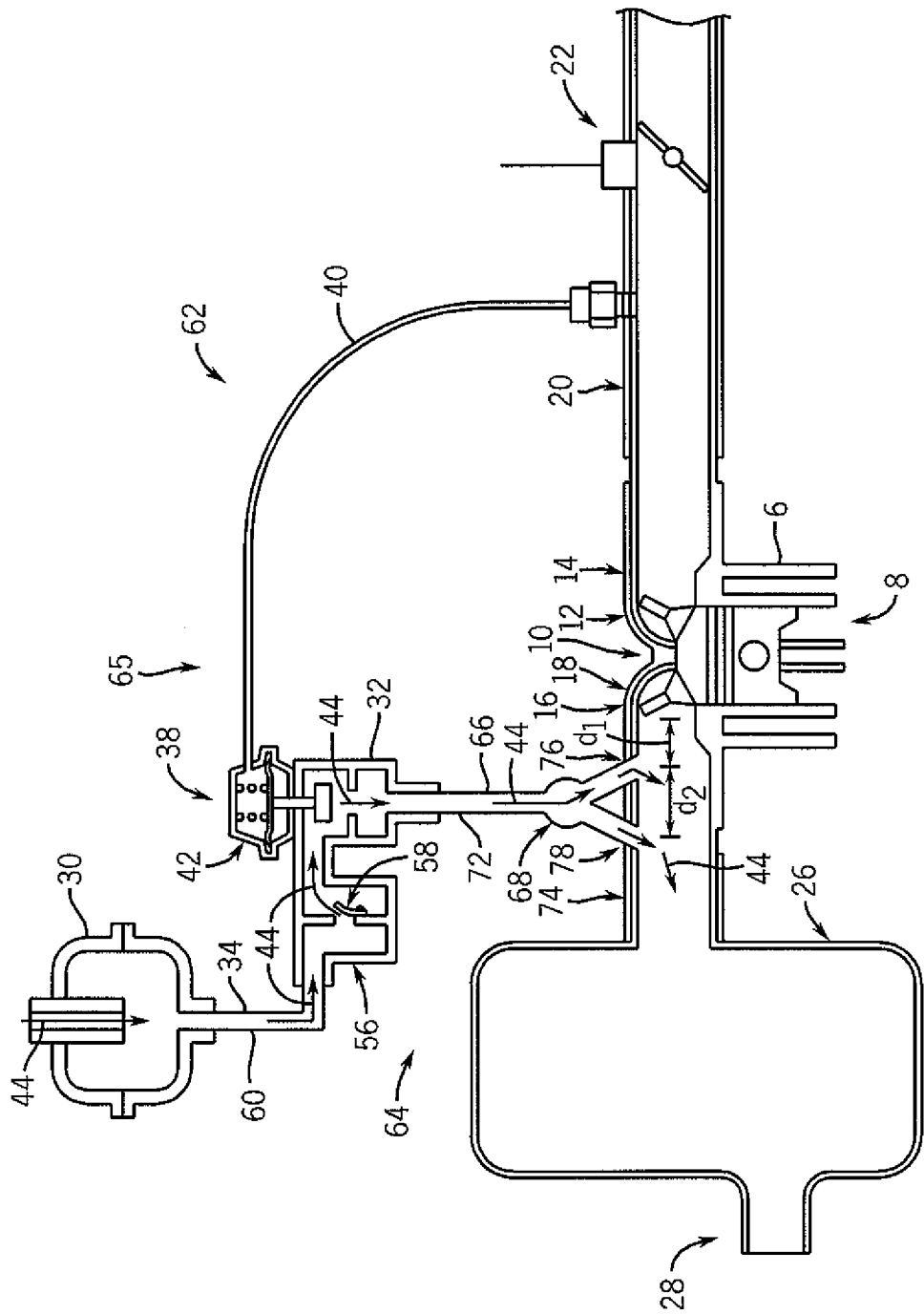
FIG. 3 is a schematic diagram of an engine employing a third exemplary exhaust system with a passive secondary air injection system that includes a pair of cascaded injection, in accordance with at least some embodiments of the present invention.

Referring to FIG. 3, a portion of a third engine 62 having a third embodiment of an exhaust system 64 is shown. The engine 62 again includes the cylinder 6, piston 8, cylinder head 10, intake port 12, intake valve 14, exhaust port 16, exhaust valve 18, intake manifold 20, throttle 22, thermal reactor muffler 26, and exhaust outlet 28. The exhaust system 64, like the exhaust system 54 in FIG. 2, is a SAI exhaust system having a SAI system 65 that includes each of the resonator 30 that receives air from an air supply, the first secondary air conduit 60, the one-way valve assembly 56 with the valve member 58, the control valve assembly 32 with valve actuator 38 and vacuum chamber 42, and the vacuum line 40. In contrast to the engine 52 of FIG. 2, however, the exhaust port 16 is coupled to the muffler 26 by way of a modified exhaust manifold 74 having first and second orifices 76 and 78, respectively, and the control valve assembly 32 is coupled to these two orifices by way of a Y-shaped secondary air conduit 66. Air thus is directed from the control valve assembly 32 through the second secondary air conduit 66 by way of a single conduit portion 72 up until a splitting junction 68, after which the air proceeds by way of a pair of conduit portions to the respective orifices 76 and 78. As with respect to the embodiment of FIG. 2, the one-way valve assembly 56 precludes air from flowing in a direction opposite to that shown by the arrows 44.

As shown, the first and second orifices 76 and 78 of the exhaust system 64 are located at different positions relative to the exhaust port 16. In particular, the first orifice 76 is located a distance $d_1$ away from the exhaust port 16, while the second orifice 78 is located a distance $d_2$ from the first orifice such that the second orifice 78 is located a distance $d_1+d_2$ from the exhaust port 16. The sizes of the distances $d_1$ and $d_2$ can vary significantly depending upon the embodiment. For example, in one embodiment, each of $d_1$ and $d_2$ could be four inches, while in another embodiment $d_1$ could be two inches while $d_2$ was eight inches. As in the embodiments of FIGS. 1 and 2, one goal of the positioning of the orifices 76 and 78 is to provide air while the exhaust is still hot and to introduce air as fast as possible as it is leaving the exhaust port 16, and yet another goal is to avoid introducing too much air such that the combustion process is quenched due to the temperature differential between the secondary air and the air coming out of the exhaust port 16. In at least some embodiments, $d_2$ has a length that corresponds generally to a half of a typical wavelength of the typical pressure waves proceeding through the exhaust manifold 74 such that, if air is injected by way of the first orifice 76 at a maximum of the pressure wave, then air is injected at the orifice 78 into a minimum of the pressure wave, and vice-versa. Such an arrangement tends to render the overall air flow rate through the control valve assembly 32 and the first conduit portion 72 of the second secondary air conduit 66 more consistent over time, and in particular tends to improve the steadiness of the air flow rate in terms of both magnitude and direction over time.

The embodiment of FIG. 3 is intended to be representative of a number of different embodiments of exhaust systems in which secondary air is injected at more than one location on or along the exhaust manifold 24 or potentially even at other locations (e.g., at the exhaust port 16 or on the muffler 26). By injecting air at multiple locations, and in particular by injecting air at multiple locations along the length of the exhaust manifold 24 and/or potentially other components of the exhaust system, a number of advantages can be achieved in comparison with the embodiment of FIG. 2 in which air is only injected at a single location. For example, having multiple injection locations allows for an increased air injection rate, better control of the air injection rate, enhanced conversion efficiency, improved control of the exothermic oxidation reaction rise time occurring within the exhaust manifold 24, and an enhanced ability to initiate the exothermic oxidation reaction. Thus, potential difficulties in initiating an exothermic oxidation reaction due to (but not limited to) excessive back pressure, poor surface-to-volume ratios of the engine, difficult injection location geometry, and low exhaust gas temperatures due to engine or exhaust system design parameters can be alleviated. It will be understood that, although FIG. 3 shows the SAI system 65 as injecting air at two locations (e.g., at the orifices 76 and 78), the present invention is also intended to encompass embodiments in which air is injected at three or more locations/orifices.

Figure 4:
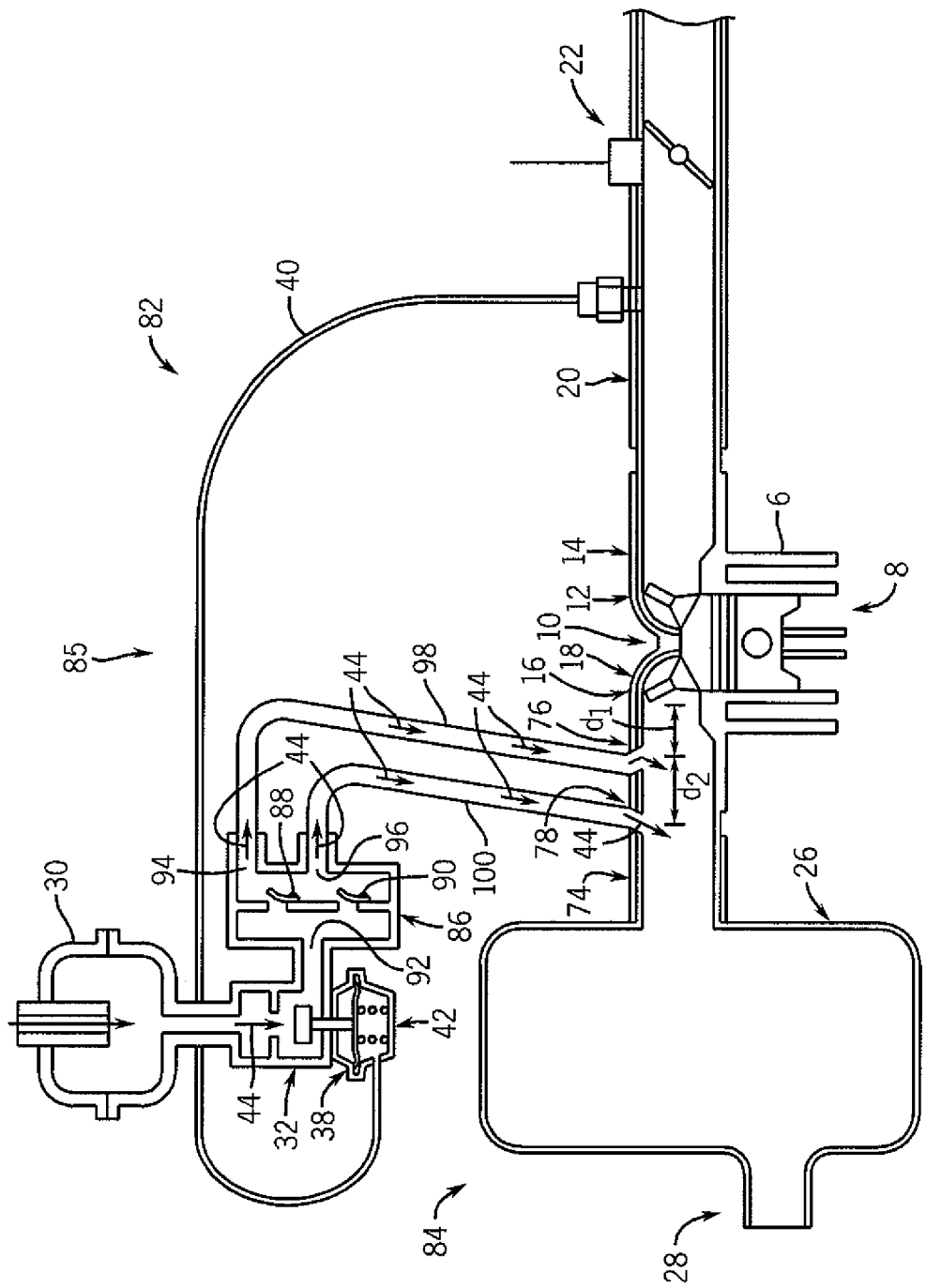
FIG. 4 is a schematic diagram of an engine employing a fourth exemplary exhaust system with a passive secondary air injection system that includes a pair of cascaded injection ports and two corresponding one-way valves, in accordance with at least some embodiments of the present invention.

Turning to FIG. 4, a portion of a fourth engine 82 having a fourth embodiment of an exhaust system 84 is shown. The engine 82, like the engine 62 of FIG. 3, includes each of the cylinder 6, the piston 8, the cylinder head 10, the intake port 12, the intake valve 14, the exhaust port 16, the exhaust valve 18, the intake manifold 20, the throttle 22, the exhaust manifold 74 having first and second orifices 76 and 78, the muffler 26, and the outlet 28. The exhaust system 84 again is a SAI exhaust system that includes a SAI system 85, which like the SAI system 65 of FIG. 3 includes the resonator 30, the control valve assembly 32 with valve actuator 38 and vacuum chamber 42, and the vacuum line 40 linking the intake manifold 20 with the control valve assembly 32. However, although the SAI system 85 injects secondary air into the exhaust manifold 74 at the two orifices 76 and 78, the SAI system nevertheless has a somewhat different arrangement than that of FIG. 3.

In particular, the SAI system 85 includes a double one-way valve assembly 86 in place of the single one-way valve assembly 56 employed in FIG. 3. The double one-way valve assembly 86 includes first and second one-way valve members 88 and 90, respectively, which respectively govern the passage of air from an input port 92 of the double one-way valve assembly 86 to first and second output ports 94 and 96 of that assembly, respectively. The first and second output ports 94 and 96 are respectively coupled to first and second secondary air conduits 98 and 100, respectively, which end at the first and second orifices 76 and 78, respectively. Further, as shown, the control valve assembly 32 is arranged in an inverted manner relative to the arrangement of FIG. 3, such that the output port of the control valve assembly as it was shown in FIG. 3 is directly coupled to the output of the resonator 30, and such that the input port of the control valve assembly as shown in FIG. 3 is coupled to the input port 92 of the double one-way valve assembly 86. Thus, in the present embodiment, the resonator 30 is coupled to the control valve assembly 32, which in turn is coupled to the input port 92 of the double one-way valve assembly 86, which in turn at its first and second output ports 94 and 96 is coupled by way of the first and second secondary air conduits 98 and 100 to the first and second orifices 76 and 78 of the exhaust manifold 74.

The exhaust system 84 of FIG. 4 operates in much the same way as that of FIG. 3. However, the embodiment of FIG. 4 is advantageous in comparison with that of FIG. 3 when implemented in relation to some engines, for example, in engines in which additional timing/phasing control of the injection pulses is desirable or necessary. In such engines, the use of the double one-way valve assembly 86 with the two independent one-way valve members 88 and 90 guarantees that the airflow into the orifice 76 is independent of the airflow into the orifice 78, and vice-versa. Further, the efficiency of the exothermic oxidation reaction within the exhaust manifold 74 can be further enhanced through the use of the exhaust system 84. This is particularly the case in engines where, due to design constraints such as packaging-related issues or acoustics, the valve assemblies 32 and 86 cannot be located close to the exhaust manifold and consequently the first and second secondary air conduits 98, 100 are relatively long. Additionally, improved thermal efficiency leading to improved conversion efficiency can be achieved through the use of the exhaust system 84. It should further be noted that, in the embodiment of FIG. 4, the physical location and geometric dimensions of each of the secondary air conduits 98, 100 significantly affects the performance of the system, and also that the valve dynamics of the one-way valve members 88, 90 is also influential upon system performance. In at least some embodiments, it is desirable that the two valve members 88 and 90 operate identically, and that the first and second secondary air conduits 98, 100 be of identical or nearly identical lengths.

As was the case with respect to the embodiment of FIG. 3, the embodiment of FIG. 4 is intended to be representative of a variety of embodiments in which secondary air is injected into the exhaust manifold (or other exhaust system components) of an engine at multiple locations such as various locations along the length of the exhaust manifold in a cascaded manner. The embodiment of FIG. 4 is intended to be representative of embodiments having not just two but also three or more injection orifices. Further, some of the parts of the exhaust system 84 could be implemented in conjunction with two-cylinder engines having two exhaust ports. That is, the portions of the exhaust system 84 including the resonator 30, the vacuum line 40, the control valve assembly 32, the spring-biased valve actuator 38, the double one-way valve assembly 86, and the first and second secondary air conduits 98 and 100 could be employed in conjunction with a two-cylinder engine, where each of the two respective secondary air conduits 98 and 100 was respectively connected to a respective exhaust manifold (or respective portions of a single exhaust manifold) associated with a respective one of the two cylinders. Such an engine could include, for example, two sets of the engine components 6-28 of FIG. 1 as well as two of the orifices 44, with each of the first and second secondary air conduits 98 and 100 being coupled to a respective one of the orifices associated with a respective one of the exhaust manifolds (or respective portions of a single exhaust manifold) associated with a respective one of the cylinders (in some such embodiments, a single manifold connected to all of the cylinders would lead to the same muffler, such that the muffler 26 and outlet 28 could be shared by both cylinders).

Additionally, the embodiment of FIG. 4 is intended to be representative of further embodiments having three or more secondary air conduits delivering air from three or more output ports of a variety of one-way valve assemblies having three or more one-way valve members, and the present invention is also intended to encompass further embodiments in which three or more such secondary air conduits are coupled to three or more exhaust manifold portions associated with three or more cylinders of an engine. Indeed, the embodiment of FIG. 4 is intended to be representative in a general sense of a variety of engines having up to n cylinders, where air is injected into 1 to m orifices associated with a respective exhaust manifold portion associated with each of the cylinders.

Figure 5:
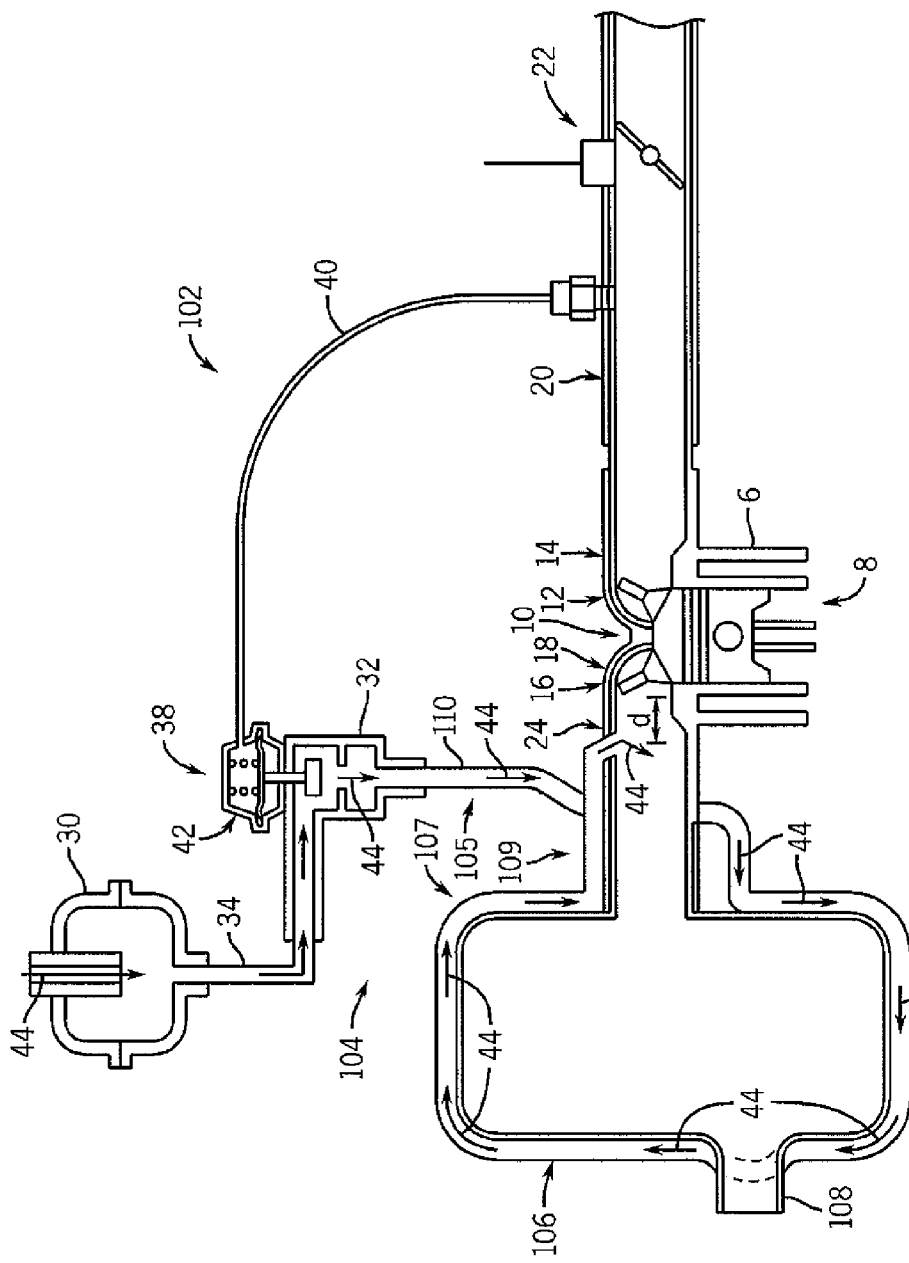
FIG. 5 is a schematic diagram of an engine employing a fifth exemplary exhaust system with a passive secondary air injection system, in which injected air is preheated by a muffler, in accordance with at least some embodiments of the present invention.

Referring next to FIG. 5, a portion of a fifth engine 102 having a fifth embodiment of an exhaust system 104 is shown. As with respect to the engine 2 of FIG. 1, the engine 102 includes the cylinder 6, the piston 8, the cylinder head 10, the intake port 12, the intake valve 14, the exhaust port 16, the exhaust valve 18, the intake manifold 20, the throttle 22, and the exhaust manifold 24. Also, the exhaust system 104 like the exhaust system 4 is a SAI exhaust system that includes a SAI system 105, which includes the resonator 30 that receives air from an air supply, the first secondary air conduit 34, the control valve assembly 32 with the spring-biased valve actuator 38 and the vacuum chamber 42, and the vacuum line 40 linking the spring-biased valve actuator with the intake manifold 20. Again, the secondary air is injected into the exhaust manifold 24 at the orifice 46 that is located a distance d from the exhaust port 16. However, in contrast to the engine 2 of FIG. 1, while the engine 102 additionally includes a muffler 106 having an outlet 108 that is coupled to and receives the exhaust via the exhaust manifold 24, the muffler (which also can be a thermal reactor muffler) differs from the muffler 26 of FIG. 1 insofar as it is integrated with a second secondary air conduit 110 that conducts air from the control valve assembly 32.

More particularly as shown, the second secondary air conduit 110 conducts air from the control valve assembly 32 to the muffler 106 and around the exterior of the muffler and then subsequently back to the orifice 44, such that the relatively cool air coming from the control valve assembly is significantly warmed by the muffler before it is provided to the exhaust manifold 24 to achieve the exothermic oxidation reaction. In at least some embodiments, the conduit 110 can be divided into three sections, a first section 105 extending from the control valve assembly 32 to the muffler 106, a second section 107 that extends along the exterior of the muffler and can potentially be integrated as part of the muffler, and a third section 109 that extends from the muffler to the orifice 44, where the third section can be integrated with the exhaust manifold 24. In at least some embodiments, the second section 107 of the conduit 110 that is formed along the exterior of the muffler 106 itself can have an exterior surface that acts as a heat shield, to prevent the heat from the muffler from escaping, such that the air conducted within the conduit is further warmed. The cool air flowing around the muffler 106 within the second section 107 of the conduit can further serve to enhance the operation of the muffler insofar as the gases within the muffler are somewhat cooled by the cool air flowing within the conduit 110. Although shown here external to the muffler, the SAI passages can be built internal to the muffler and can be located so as to insulate the entirety, or merely a portion, of the muffler.

The engine 102 and exhaust system 104 of FIG. 5 can be advantageous insofar as the secondary air that is injected into the exhaust manifold 24 is preheated by the muffler 106, which can in turn increase the conversion efficiency of the exothermic oxidation reaction occurring within the exhaust manifold due to the introduction of the secondary air. In the present embodiment, the muffler 106 uses an air-gap passage for the secondary air that not only results in preheating of the secondary air but also provides a thermal barrier for the muffler, eliminating or reducing the need for a muffler heat shield, which can reduce the likelihood that an outer surface of the muffler will be undesirably hot. The muffler thus acts as a heat shield in combination with a heat exchanger. Further, in at least some embodiments, the muffler preferably has an internal geometry designed to enhance and preserve the exothermic oxidation reaction so as to increase conversion efficiency as well.

Turning to FIG. 6A, in at least some embodiments of the present invention, the air supply referred to above can be an air cleaner as are commonly used in conjunction with internal combustion engines. As shown in FIG. 6A, in one such embodiment, an engine 112 includes an exhaust system 114 having an air cleaner assembly 116 and a SAI system 115, which supplies secondary air to an exhaust manifold 118 by way of a secondary air conduit 120. As air proceeds from an exhaust port (not shown) within the engine 112 through the exhaust manifold 118, air is drawn from the air cleaner assembly 116 through the conduit 120 into the exhaust manifold 118 to allow the exothermic oxidation reaction to occur prior to the exhaust gases flowing into a muffler 122 and subsequently out an outlet 124 of the muffler.

Further referring to FIG. 6A, an exploded view of the air cleaner assembly 116 is also provided. As shown, the air cleaner 116 includes an air cleaner cover 126 and an air cleaner base 128 that are configured to house an air filter 130 positioned therebetween. In the present embodiment, each of these components 126-130 is substantially rectangular in shape, although in other embodiments these components could have other shapes (e.g., they could be cylindrical). Additionally as shown, the conduit 120 is coupled to the base 128 and in particular to a one-way valve assembly 132 located within the base. The one-way valve assembly 132, which in the present embodiment includes a one-way valve member that is similar to that of FIG. 2 (e.g., reed valve) is positioned adjacent to a primary output port 134 of the air cleaner 116 at which air flows out of the air cleaner toward the engine intake. That is, both the input to the one-way valve assembly 132 and the output port 134 receive filtered air that has passed through the filter 130 when the air cleaner assembly 116 is assembled and operational (the input for the air cleaner assembly 116 is not shown).

Figure 6B:
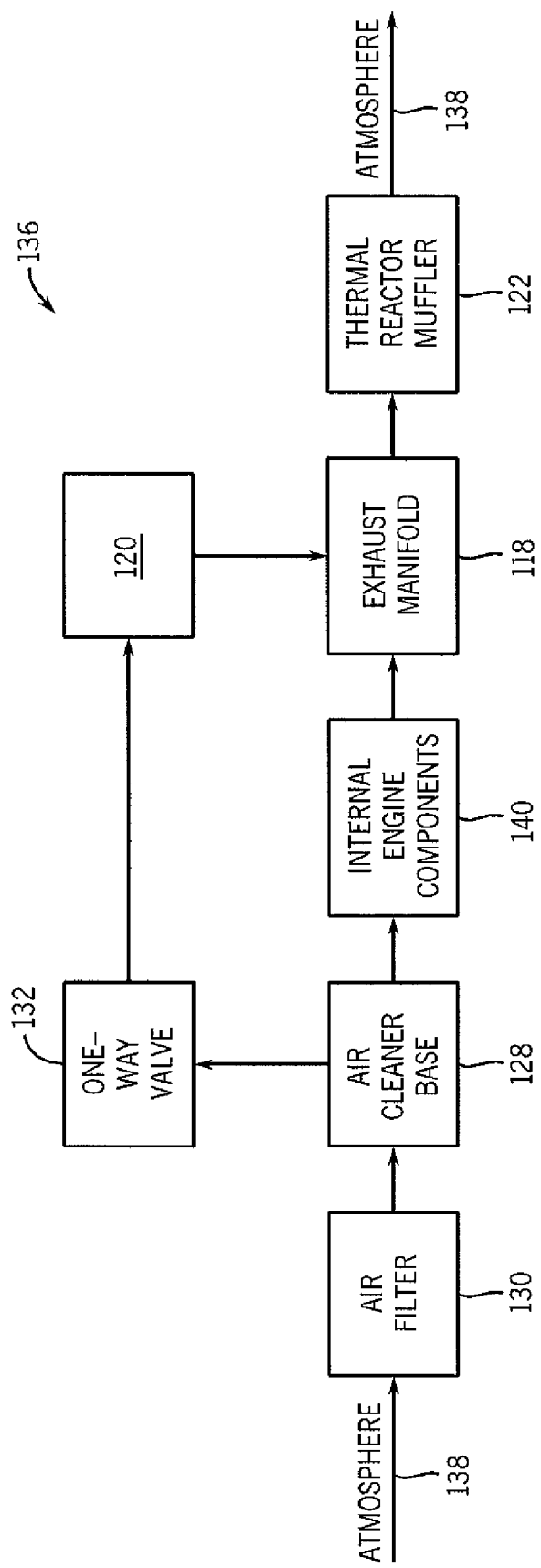
FIG. 6B is a block diagram showing exemplary interoperation of the engine components of the engine of FIG. 6A.

Referring additionally to FIG. 6B, a block diagram 136 shows in schematic form how the air passes through the engine 112 and in particular through the air cleaner assembly 116 and the exhaust system 114 of the engine. As shown, air from the atmosphere 138 proceeds into the air cleaner assembly 116 and in particular through the air filter 130, and then subsequently arrives at the air cleaner base 128. From the air cleaner base 128, the air proceeds through the output port 134 to internal engine components 140, which can be understood to include for example the throttle 22 (of FIG. 1), the intake manifold 20, the engine cylinders such as the cylinder 6, the pistons such as the piston 8, the intake ports and intake valves such as the intake port 12 and the intake valve 14, and the exhaust ports and exhaust valves such as the exhaust port 16 and the exhaust valve 18, among other components. While most of the air proceeds to the internal engine components 140, some of the air proceeds to the one-way valve assembly 132, after which it proceeds down the secondary air conduit 120 and subsequently into the exhaust manifold 118, at which it is mixed with the exhaust gases coming from the internal engine components 140. The resulting exhaust gases then are passed to the muffler 122, and then exit the muffler into the atmosphere 138.

The embodiment shown in FIGS. 6A and 6B is advantageous in that it integrates the one-way valve assembly 132 into the engine air cleaner assembly 116, which can allow for reductions in the complexity, manufacturing cost, and weight of the combined engine assembly. Additionally, the embodiment is advantageous insofar as the air provided to the exhaust manifold 118 as secondary air is filtered due to the filter 130 of the air cleaner assembly 116 and consequently no special additional filter is required for implementation as part of the SAI system 115 (in contrast, such a special filter might be desirable or necessary for implementing the embodiments shown in FIGS. 1-5, in some circumstances). Although in the embodiment of FIGS. 6A and 6B only the one-way valve assembly 132 is included in the air cleaner assembly 116, in other embodiments a control valve assembly such as the control valve assembly 32 of FIG. 1 could also be integrated into the air cleaner assembly. Also, while no resonator corresponding to the resonator 30 of FIG. 1 is employed in the present embodiment, alternate embodiments could employ such a resonator. Further, in at least some embodiments, multiple one-way valve assemblies (and/or control valve assemblies) such as those shown in FIG. 4 could be integrated within the air cleaner assembly. In at least some circumstances, the embodiment of FIGS. 6A and 6B can be used to throttle secondary air at high engine loads/speeds, with associated benefits.

Figure 7A:
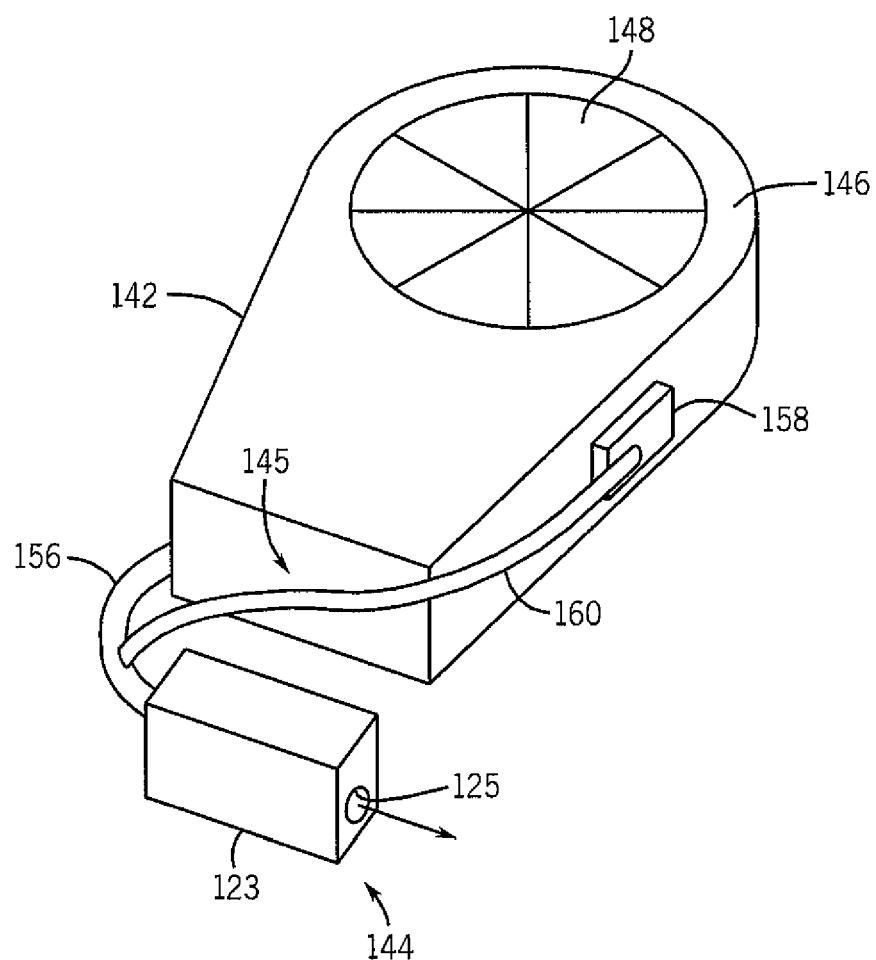
FIG. 7A is a top perspective view of an engine in which a passive secondary air injection system is combined with a blower housing of the engine, in accordance with at least some embodiments of the present invention.
Figure 7B:
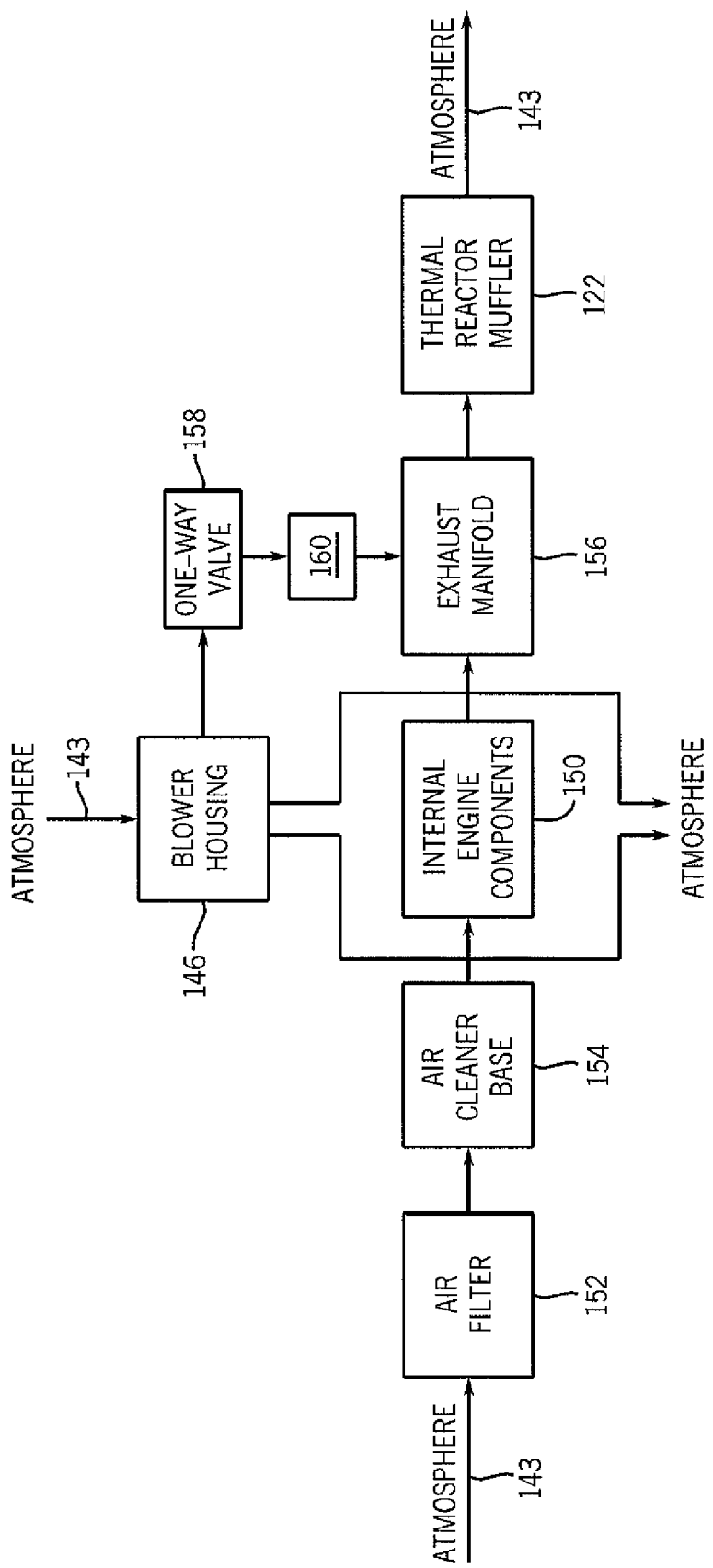
FIG. 7B is a block diagram showing exemplary interoperation of the engine components of the engine of FIG. 7A.

Turning to FIGS. 7A and 7B, still another embodiment of an engine 142 is shown having an exhaust system 144 with a SAI system 145. In this embodiment, air from the atmosphere 143 (see FIG. 7B) is drawn into a blower housing 146 by way of a fan 148 (see FIG. 7A). Most of the air drawn into the blower housing 146 is driven around internal engine components 150 of the engine 142 to cool those components, and then subsequently out back into the atmosphere 143, as shown in FIG. 7B. The internal engine components 150 can include, for example, the components 6-22 of FIG. 1 relating to the cylinder, piston, intake manifold, throttle and related components of the engine (as well as, in multi-cylinder engines, several of some of these components). Further as shown in FIG. 7B, the air required by the internal engine components 150 for their operation is provided from the atmosphere 143 by way of an air filter 152 and an air cleaner base 154.

In contrast to the embodiment of FIGS. 6A-6B, in the present embodiment of FIGS. 7A-7B, the air supplied as the secondary air to an exhaust manifold 156 is not provided from the air cleaner base 154. Rather, in this embodiment, air from the blower housing 146 is diverted to a one-way valve assembly 158, which includes a one-way valve member such as a reed valve component. After passing through the one-way valve assembly 158, the secondary air is provided to a secondary air conduit or hose 160, which in turn supplies the air to the exhaust manifold 156. Upon mixing of the secondary air with the exhaust gases coming from the internal engine components 150 within the exhaust manifold 156, the exhaust gases are then provided to a muffler 123 and exit the muffler at an outlet 125 (see FIG. 7A) into the atmosphere 143.

Although different from the embodiment shown in FIGS. 6A and 6B, the embodiment of FIGS. 7A and 7B provides several similar advantages. In particular, the embodiment of FIGS. 7A and 7B integrates the one-way valve assembly 158 into an existing component, the blower housing, which reduces the complexity and cost of implementing and manufacturing the exhaust system 144 (and in particular the SAI system 145), and also can reduce the weight of the exhaust system components. Although the particular embodiment shown in FIGS. 7A and 7B shows the single one-way valve assembly 158 as being implemented within the blower housing 146, in other embodiments multiple such one-way valve assemblies and/or other components such as the control valve assembly 32 of FIG. 4 could be implemented additionally in conjunction with the blower housing. In contrast with the embodiment of FIGS. 6A and 6B, however, the SAI system 145 of FIGS. 7A and 7B has the benefit of receiving air at a positive pressure (above atmospheric pressure), thus improving the flow of SAI into the exhaust manifold.

Figure 8:
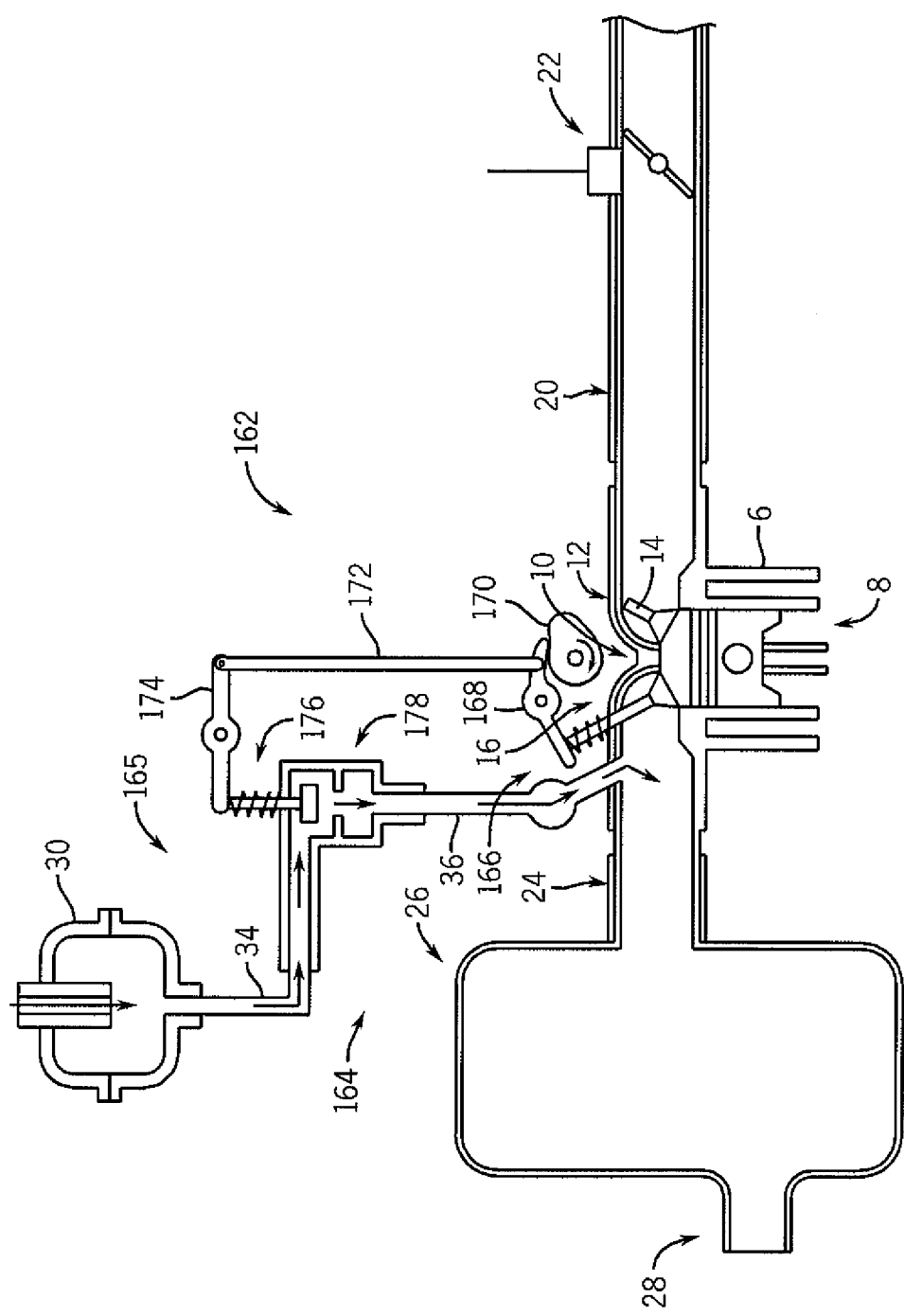
FIG. 8 is a schematic diagram of an engine employing another exemplary exhaust system with a passive secondary air injection system that employs a driven one-way valve in accordance with at least some embodiments of the present invention.

Turning to FIG. 8, a further embodiment of an engine 162 is shown that includes a further embodiment of a SAI exhaust system 164 having a SAI system 165. In this embodiment, the engine 162 includes the cylinder 6, piston 8, cylinder head 10, intake port 12, intake valve 14, exhaust port 16, intake manifold 20, throttle 22, exhaust manifold 24, muffler 26, and outlet 28 shown in FIG. 1. The SAI system 165, similar to that of FIG. 1, also includes the resonator 30 that receives air from an air supply (not shown), the first secondary air conduit 34, and the second secondary air conduit 36. In contrast to the embodiment of FIG. 1, however, an exhaust valve 166 of the engine 162 is actuated by way of a rocker arm 168 driven by a cam 170. The rocker arm 168 also is coupled by way of a push rod 172 to a second rocker arm 174 that drives a valve 176 of a valve assembly 178 that is coupled between the first and second secondary air conduits 34 and 36, respectively. The valve assembly 178 can take a form similar to that of the control valve assembly 32 of FIG. 1 except insofar as the valve of the valve assembly is driven by the rocker arm 174 (and an additional spring) rather than by way of any vacuum within any vacuum chamber.

Assuming proper rotational alignment of the cam 170 driving the rocker arm 168 and the push rod 172, the valve 176 can be made to open and close at appropriate times in concert with the operation of the exhaust valve 166 and other engine components so as to achieve desired injection of secondary air into the exhaust manifold 24 and to facilitate the exothermic oxidation reaction occurring therein. For example, the valve 176 can be made to open whenever the vacuum within the exhaust manifold 24 is at its greatest level. Also in some embodiments, the valve 176 can be actuated in a manner that takes into account the vacuum levels within the intake manifold 20. The timing of the valve 176 in FIG. 8 can also be similar to that which is naturally experienced by the one-way valves shown in FIGS. 2-4 and 6A-7B. For example, the valve 176 can be opened from a time at which the piston 8 is 90° after its top dead center position to another time at which it is 120° after its top dead center position.

In comparison with the embodiments of FIGS. 2-7B, which employ one or more one-way valve assemblies, the embodiment of FIG. 8 in some circumstances can be more efficient in its operation, particularly where only low differential pressures exist between the atmosphere and the pressure within the exhaust manifold, and also can be more accurate in timing (since one-way valve assemblies can exhibit imperfect timing on occasion due to valve inertia). Indeed, in at least some circumstances, the present embodiment can be timed exactly with engine speed and exhaust dynamics to optimize conversion efficiency, regardless of how fast the engine is operating and how much exhaust is being produced due to the combustion process. Further, depending upon the embodiment, the exhaust valve 166 can take a variety of forms including, for example, that of a poppet valve, a rotary valve or another valve that is driven by engine operation or driven electrically. Although in the present embodiment of FIG. 8 the valve assembly 178 only has the single valve 176, the present invention is also intended to encompass embodiments in which more than one valve or value assemblies are employed, including potentially embodiments having combinations of each of the different types of valve assemblies described herein. In alternate embodiments, a control valve assembly can also be included.

Figure 9:
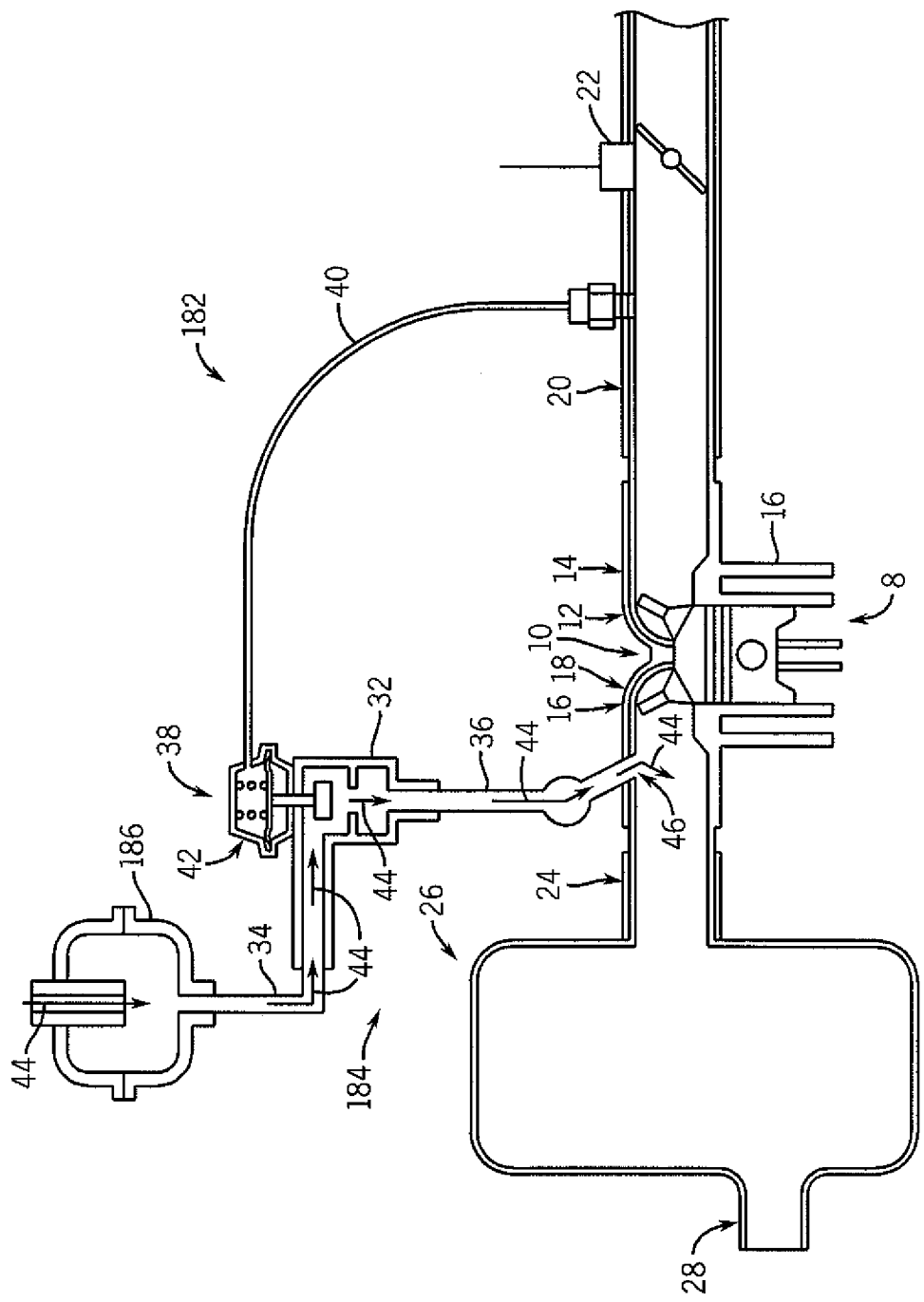
FIG. 9 is a schematic diagram of an engine employing a further exemplary secondary air injection system that is an active secondary air injection system employing an air pump, in accordance with at least some embodiments of the present invention.

Turning to FIG. 9, an additional engine 182 is shown having an additional embodiment of exhaust system 184. In this embodiment, the engine 182 like the engine 2 of FIG. 1 includes each of the cylinder 6, the piston 8, the cylinder head 10, the intake port 12, the intake valve 14, the exhaust port 16, the exhaust valve 18, the intake manifold 20, the throttle 22, the exhaust manifold 24, the muffler 26, and the outlet 28. Further, the exhaust system 184, which is a SAI exhaust system having a SAI system 185, is identical to the exhaust system 4 of FIG. 1 except insofar as the exhaust system 184 includes a pump 186 in place of the resonator 30. Thus, the exhaust system 184 includes the first secondary air conduit 34, the control valve assembly 32 with the spring-biased valve actuator 38 and the vacuum chamber 42, the second secondary air conduit 36 that provides air into the exhaust manifold 24 at the orifice 46, and the vacuum line 40. However, instead of relying upon the vacuum that occurs within the exhaust manifold 24 to passively draw in air by way of the conduits 34, 36 and the control valve assembly 32, air is forced into the exhaust manifold 24 due to the operation of the pump 186, which receives the air from an air supply (which could be, for example, an air cleaner or merely the outside atmosphere).

Although not shown in FIG. 9, in alternate embodiments, a one-way valve assembly could also be incorporated in series between the pump 196 and the orifice 46, albeit such a valve assembly would in most cases not be necessary in view of the presence of the pump 186. Depending upon the embodiment, the pump 186 can be any of a variety of different types of air pumps including, for example, pulse pumps, electrical pumps, mechanical pumps or other pumps. Although a pump is only shown in the embodiment of FIG. 9, it should be understood that each of the different embodiments of FIGS. 1-9 disclosed herein can be configured to include a pump, so as to have an active SAI system, or to not include a pump, so as to have a passive SAI system. While not required, the use of a pump can be desirable in some circumstances to further improve the efficiency of the SAI system and the exothermic oxidation reaction that takes place in the exhaust manifold due to the injection of the secondary air, particularly where the operation of the pump is able to provide higher system pressures to drive higher rates of secondary air flow into the exhaust manifold than are available from passive airflow. This can be the case, for example, in circumstances where the engine is operated over a wide variety of speeds and/or in conjunction with a wide variety of loads, or in other situations where there is only a limited pressure differential between the outside atmosphere and the pressure within the exhaust manifold.

The present invention is intended to be applicable to a wide variety of different types of engines, and in particular is not limited to single-cylinder engines as shown in the FIGS. For example, the embodiments of the present invention could be used in two-cylinder, four-cylinder or other multi-cylinder engines. Further, while the above-described embodiments primarily relate to systems in which exhaust emissions are reduced through the injection of secondary air without the use of any catalytic converter, it is intended that the present invention also encompass embodiments in which both secondary air injection and one or more catalytic converters are employed. Additionally, the control valve assembly 32 along with the spring-biased valve actuator 38 and the vacuum chamber 42 and vacuum line 40 shown in some of the above embodiments are optional components that need not be used.

It should further be noted that, although each of the above-described embodiments of FIGS. 1-9 is shown to include certain respective features that differentiate the respective embodiment from the other embodiments shown, the present invention is also intended encompass other embodiments in which any of the particular features shown in any of the embodiments are combined with one another. For example, the present invention is also intended to encompass exhaust systems that employ both the muffler shown in FIG. 5 in which the secondary air is warmed by the muffler, as well as the air cleaner assembly 116 of FIGS. 6A-6B, or the blower housing 146 of FIGS. 7A-7B. Further for example, the muffler of FIG. 5 could be employed in an embodiment having multiple secondary conduits such as those shown in FIGS. 3 and 4, and/or an embodiment having a one-way valve such as that of FIG. 2.

Figure 10:
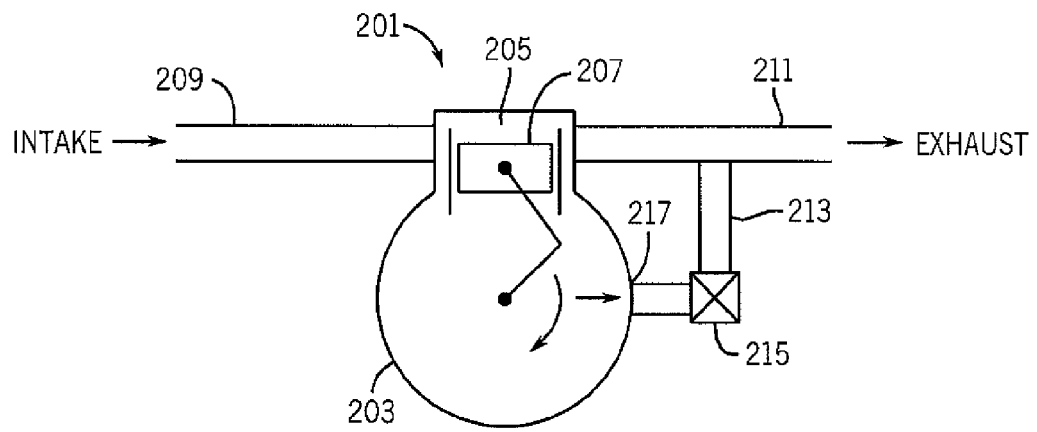
FIG. 10 is a schematic diagram of an engine employing a first exemplary exhaust system with a combination crankcase ventilation and secondary air injection system in accordance with at least some embodiments of the present invention.

One embodiment of a combination crankcase ventilation and secondary air injection system is shown in FIG. 10. An internal combustion engine 201 comprises a crankcase 203. A piston 207 reciprocates back and forth through a piston cylinder 205. The reciprocal movement of piston 207 changes the volume and pressure within crankcase 203. An intake manifold 209 allows a combustible mixture of fuel and air to enter cylinder 205 above piston 207. An exhaust manifold 211 provides a flow path for the combustion gases to the exhaust system. Some combustion gases will blow by the piston rings of piston 207 and enter the crankcase 203. These blow by gases must be removed from crankcase 203 to avoid pressure buildup within the crankcase and deterioration of the crankcase oil. A combined crankcase ventilation and secondary air system 213 provides communication between crankcase 203 and exhaust manifold 211. The crankcase gases are forced by the movement of the piston through an exit port 217 through a valve 215. Valve 215 is an inlet for secondary air into the exhaust system. The secondary air and the crankcase gases are mixed in valve 215 prior to being introduced into the exhaust manifold 211 where they will eventually be combusted.

Figure 11:
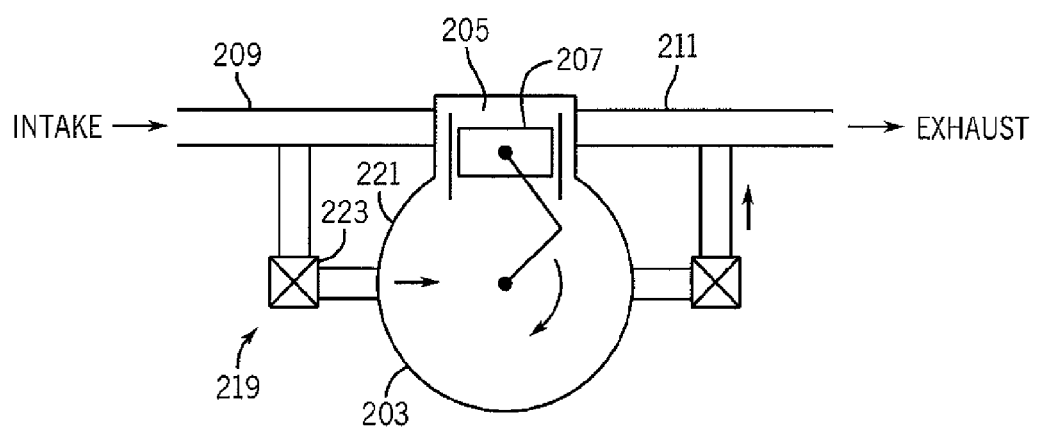
FIG. 11 is a schematic diagram of an engine employing a second exemplary exhaust system with a combination crankcase ventilation and secondary air injection system in accordance with some embodiments of the present invention.

Another embodiment of the combined crankcase ventilation and secondary air injection system is shown in FIG. 11. The design of FIG. 11 includes all the parts of the embodiment of FIG. 10, but also includes an air intake system 219. Air intake system 219 comprises a line between the intake manifold 209 and the crankcase 203. Air from the intake manifold passes through valve 223 where makeup air may also be added, and from there, enters through inlet port 221 into the crankcase 203. Valve 223 may be a reed valve, check valve, ball valve or other one directional flow controlling mechanism. It could also be a mechanically, pneumatically or electrically controlled displacement pump. Valve 223 and also valve 215 could be a two-way valve with appropriate design in plumbing. The gases from the crankcase 203 may be routed entirely to the exhaust manifold 211 or, alternatively, a fraction of the crankcase gas may be routed to the intake system 209.

It is specifically intended that the present invention not be limited to the embodiments and illustrations contained herein, but include modified forms of those embodiments including portions of the embodiments and combinations of elements of different embodiments as come within the scope of the following claims.

We claim:

1. An internal combustion engine comprising:
a cylinder;
an exhaust conduit coupled to the cylinder and receiving exhaust emissions from the cylinder;
a blower housing;
a secondary air conduit coupling an inner region within the blower housing to an orifice on the exhaust conduit,
wherein the secondary air conduit receives air from the inner region and communicates the air to the orifice, the air being directed through the blower housing by a fan that directs at least some additional air to proceed out the blower housing and around one or more engine components so as to cool the one or more engine components, and
wherein the air communicated to the orifice is mixed with the exhaust emissions and, due to an exothermic oxidation reaction, results in a reduction in at least one component of the exhaust emissions;
a first valve assembly associated with the secondary air conduit, wherein the first valve assembly at least partially governs a flow of the air through the secondary air conduit to the orifice on the exhaust conduit, wherein the first valve assembly is implemented within the blower housing, wherein the first valve assembly includes a one-way valve that is a reed valve, wherein a reed of the reed valve has a length ranging from about 20 millimeters to about 50 millimeters, wherein the reed has a width ranging from about 10 millimeters to about 20 millimeters, and wherein the reed has a thickness ranging from about 0.05 millimeters to about 0.3 millimeters; and
a muffler coupled to the exhaust conduit, wherein the muffler operates at a back pressure ranging from 22.1 to 62 inches of water at the rated power, wherein the muffler has a size selected to achieve a volume ratio, VR, which is a volume of the muffler divided by a cylinder displacement, ranging from about 3 to about 10,
wherein the engine does not include any catalytic converter, and wherein the engine is a small off-road engine.

2. The internal combustion engine of claim 1, wherein the air flows through the secondary air conduit at a rate of 60 to 120 liters per minute at a pressure differential of 300 millimeters of water.

3. The internal combustion engine of claim 2, wherein the secondary air conduit has a length of greater than 0 to about 550 millimeters.

4. The internal combustion engine of claim 3, wherein the secondary air conduit has an internal diameter of about 9.5 to about 13 millimeters.

5. The internal combustion engine of claim 4, wherein the back pressure is a function of the volume ratio according to the formula BP=5.7 VR+5 wherein the BP is the back pressure at a related power.

6. The internal combustion engine of claim 5, wherein the engine has a displacement of less than 1 liter.

7. The internal combustion engine of claim 6, further comprising a second valve assembly linked directly with an intake conduit that is coupled to the cylinder such that an additional pressure within the intake conduit is applied to the second valve assembly, and wherein the second valve assembly at least partially governs the flow of the air through the secondary air conduit based upon the additional pressure.

8. The internal combustion engine of claim 7, wherein the second valve assembly is connected to the intake conduit by way of a vacuum line, and wherein the second valve assembly includes a spring-biased actuator and a vacuum chamber.

9. An internal combustion engine comprising:
an exhaust conduit coupled to a cylinder and receiving exhaust emissions from the cylinder;
a blower housing;
a secondary air conduit coupled between a first valve assembly and the exhaust conduit, wherein the first valve assembly includes a one-way valve that is selected from the group consisting of a reed valve, a ball valve, and an umbrella valve,
wherein the engine does not include any catalytic converter,
wherein the first valve assembly at least partially governs a flow of first air through the secondary air conduit into the exhaust conduit,
wherein the first air is received at a positive pressure so as to improve the flow into exhaust conduit,
wherein the first air is mixed with the exhaust emissions and, due to an exothermic oxidation reaction, a reduction in at least one component of the exhaust emissions occurs, and
wherein the first air is directed through the blower housing by a fan that directs at least some second air to proceed out the blower housing and around one or more engine components so as to cool the one or more engine components; and
a muffler coupled to the exhaust conduit, wherein the muffler operates at a back pressure ranging up to 62 inches of water at the rated power, and wherein the muffler has a size selected to achieve a volume ratio, VR, which is a volume of the muffler divided by a cylinder displacement, ranging from about 3 upward.

10. The internal combustion engine of claim 9, wherein the first valve assembly is implemented within the blower housing.

11. The internal combustion engine of claim 10, wherein the one or more engine components include a cylinder, an intake manifold, and a throttle.

12. The internal combustion engine of claim 9, wherein the first air flows through the secondary air conduit at a rate of 60 to 120 liters per minute at a pressure differential of 300 millimeters of water.

13. The internal combustion engine of claim 12, wherein the secondary air conduit has a length of greater than 0 to about 550 millimeters.

14. The internal combustion engine of claim 13, wherein the secondary air conduit has an internal diameter of about 9.5 to about 13 millimeters.

15. The internal combustion engine of claim 14, wherein the back pressure is a function of the volume ratio according to the formula BP=5.7 VR+5 wherein the BP is the back pressure at a related power.

16. The internal combustion engine of claim 15, wherein the engine has a displacement of less than 1 liter.

17. The internal combustion engine of claim 9, further comprising a second valve assembly linked directly with an intake conduit that is coupled to the cylinder such that an additional pressure within the intake conduit is applied to the second valve assembly, and wherein the second valve assembly at least partially governs the flow of the first air through the secondary air conduit based upon the additional pressure.

18. The internal combustion engine of claim 17, wherein the second valve assembly is connected to the intake conduit by way of a vacuum line, and wherein the second valve assembly includes a spring-biased actuator and a vacuum chamber.

19. An internal combustion engine comprising:
a cylinder;
an exhaust conduit coupled to the cylinder and receiving exhaust emissions from the cylinder;
a blower housing;
a secondary air conduit coupling an inner region within the blower housing to an orifice on the exhaust conduit,
wherein the secondary air conduit receives air from the inner region and communicates the air to the orifice, the air being directed through the blower housing by a fan that directs at least some additional air to proceed out the blower housing and around one or more engine components so as to cool the one or more engine components, and
wherein the air communicated to the orifice is mixed with the exhaust emissions and, due to an exothermic oxidation reaction, results in a reduction in at least one component of the exhaust emissions;
a first valve assembly associated with the secondary air conduit, wherein the first valve assembly at least partially governs a flow of the air through the secondary air conduit to the orifice on the exhaust conduit, wherein the first valve assembly is implemented within the blower housing, and wherein the first valve assembly includes a one-way valve that is selected from the group consisting of a reed valve, a ball valve, and an umbrella valve; and
a muffler coupled to the exhaust conduit, wherein the muffler operates at a back pressure ranging up to 62 inches of water at the rated power, wherein the muffler has a size selected to achieve a volume ratio, VR, which is a volume of the muffler divided by a cylinder displacement, ranging from about 3 upward,
wherein the engine does not include any catalytic converter, and wherein the engine is a small off-road engine.

20. The internal combustion engine of claim 19, wherein the one-way valve is the reed valve, and wherein a reed of the reed valve has a thickness ranging from about 0.05 millimeters to about 0.3 millimeters.

21. The internal combustion engine of claim 20, wherein the reed has a length ranging from about 20 millimeters to about 50 millimeters, and wherein the reed has a width ranging from about 10 millimeters to about 20 millimeters.

22. The internal combustion engine of claim 19, further comprising:
a second valve assembly linked directly with an intake conduit that is coupled to the cylinder such that an additional pressure within the intake conduit is applied to the second valve assembly, wherein the second valve assembly at least partially governs the flow of the air through the secondary air conduit based upon the additional pressure, and wherein the second valve assembly is connected to the intake conduit by way of a vacuum line, and wherein the second valve assembly includes a spring-biased actuator and a vacuum chamber.

23. The internal combustion engine of claim 9, wherein the one-way valve is the reed valve, and wherein a reed of the reed valve has a thickness ranging from about 0.05 millimeters to about 0.3 millimeters.

24. The internal combustion engine of claim 23, wherein the reed has a length ranging from about 20 millimeters to about 50 millimeters, and wherein the reed has a width ranging from about 10 millimeters to about 20 millimeters.

25. An internal combustion engine comprising:
an exhaust conduit coupled to a cylinder and receiving exhaust emissions from the cylinder;
a blower housing; and
a secondary air conduit coupled between a first valve assembly and the exhaust conduit,
wherein the engine does not include any catalytic converter,
wherein the first valve assembly at least partially governs a flow of first air through the secondary air conduit into the exhaust conduit,
wherein the first air is received at a positive pressure so as to improve the flow into exhaust conduit,
wherein the first air is mixed with the exhaust emissions and, due to an exothermic oxidation reaction, a reduction in at least one component of the exhaust emissions occurs, and
wherein the first air is directed through the blower housing by a fan that directs at least some second air to proceed out the blower housing and around one or more engine components so as to cool the one or more engine components further comprising a second valve assembly linked directly with an intake conduit that is coupled to the cylinder such that an additional pressure within the intake conduit is applied to the second valve assembly, and wherein the second valve assembly at least partially governs the flow of the first air through the secondary air conduit based upon the additional pressure, and wherein the second valve assembly is connected to the intake conduit by way of a vacuum line, and wherein the second valve assembly includes a spring-biased actuator and a vacuum chamber.

26. The internal combustion engine of claim 25, wherein the first valve assembly is implemented within the blower housing.

27. The internal combustion engine of claim 26, wherein the one or more engine components include a cylinder, an intake manifold, and a throttle.

28. The internal combustion engine of claim 25, wherein the first air flows through the secondary air conduit at a rate of 60 to 120 liters per minute at a pressure differential of 300 millimeters of water.

29. The internal combustion engine of claim 28, wherein the secondary air conduit has a length of greater than 0 to about 550 millimeters.

30. The internal combustion engine of claim 29, wherein the secondary air conduit has an internal diameter of about 9.5 to about 13 millimeters.

31. The internal combustion engine of claim 30, wherein a back pressure at which a muffler of the engine operates is a function of the volume ratio according to the formula BP=5.7 VR+5 wherein the BP is the back pressure at a related power.

32. The internal combustion engine of claim 31, wherein the engine has a displacement of less than 1 liter.

33. The internal combustion engine of claim 25, wherein the first valve assembly includes a reed valve, and wherein a reed of the reed valve has a thickness ranging from about 0.05 millimeters to about 0.3 millimeters.

34. The internal combustion engine of claim 33, wherein the reed has a length ranging from about 20 millimeters to about 50 millimeters, and wherein the reed has a width ranging from about 10 millimeters to about 20 millimeters.

35. An internal combustion engine comprising:
an exhaust conduit coupled to a cylinder and configured to receive exhaust emissions from the cylinder;
a muffler coupled to the exhaust conduit, wherein the muffler operates at a back pressure ranging up to 62 inches of water at the rated power, and wherein the muffler has a size selected to achieve a volume ratio, VR, which is a volume of the muffler divided by a cylinder displacement, ranging from about 3 upward;
a blower housing;
a first valve assembly including a one-way valve that is selected from the group consisting of a reed valve, a ball valve, and an umbrella valve;
a secondary air conduit coupled between the first valve assembly and the exhaust conduit; and
a fan that is configured to direct first air through the blower housing so that the first air is received at a positive pressure in the secondary air conduit so as to improve the flow into the exhaust conduit, wherein the first valve assembly is configured to at least partially govern a flow of the first air through the secondary air conduit into the exhaust conduit, and also configured to direct at least some second air to proceed out the blower housing and around one or more engine components so as to cool the one or more engine components,
wherein the internal combustion engine, which does not include any catalytic converter, is configured to operate so that the first air is mixed with the exhaust emissions and, due to an exothermic oxidation reaction, a reduction in at least one component of the exhaust emissions occurs.

36. The internal combustion engine of claim 35, wherein the first valve assembly is implemented within the blower housing.

37. The internal combustion engine of claim 36, wherein the one or more engine components include a cylinder, an intake manifold, and a throttle.

38. The internal combustion engine of claim 35, wherein the first air flows through the secondary air conduit at a rate of 60 to 120 liters per minute at a pressure differential of 300 millimeters of water.

39. The internal combustion engine of claim 38, wherein the secondary air conduit has a length of greater than 0 to about 550 millimeters.

40. The internal combustion engine of claim 39, wherein the secondary air conduit has an internal diameter of about 9.5 to about 13 millimeters.

41. The internal combustion engine of claim 40, wherein the back pressure is a function of the volume ratio according to the formula BP=5.7 VR+5 wherein the BP is the back pressure at a related power.

42. The internal combustion engine of claim 41, wherein the engine has a displacement of less than 1 liter.

43. The internal combustion engine of claim 35, further comprising a second valve assembly linked directly with an intake conduit that is coupled to the cylinder such that an additional pressure within the intake conduit is applied to the second valve assembly, and wherein the second valve assembly at least partially governs the flow of the first air through the secondary air conduit based upon the additional pressure.

44. The internal combustion engine of claim 43, wherein the second valve assembly is connected to the intake conduit by way of a vacuum line, and wherein the second valve assembly includes a spring-biased actuator and a vacuum chamber.

45. The internal combustion engine of claim 35, wherein the one-way valve is the reed valve, and wherein a reed of the reed valve has a thickness ranging from about 0.05 millimeters to about 0.3 millimeters.

46. The internal combustion engine of claim 45, wherein the reed has a length ranging from about 20 millimeters to about 50 millimeters, and wherein the reed has a width ranging from about 10 millimeters to about 20 millimeters.

47. A method of operating an internal combustion engine comprising:
    providing a secondary air conduit coupled between a first valve assembly and an exhaust conduit, wherein the first valve assembly includes a one-way valve that is selected from the group consisting of a reed valve, a ball valve, and an umbrella valve,
    directing first air through a blower housing by a fan;
    directing, by way of the fan, at least some second air to proceed out the blower housing and around one or more engine components so as to cool the one or more engine components;
    at least partially governing a flow of the first air through the secondary air conduit into the exhaust conduit by way of the first valve assembly, wherein the first air is received in the secondary air conduit at a positive pressure;
    receiving exhaust emissions from the cylinder at the exhaust conduit;
    communicating the first air into the exhaust conduit, wherein the flow of the first air into the exhaust conduit is improved due to the receiving of the first air at the positive pressure;
    mixing the first air with the exhaust emissions at the exhaust conduit so that, due to an exothermic oxidation reaction, a reduction in at least one component of the exhaust emissions occurs, even though the engine does not include any catalytic converter; and
    receiving an output from the exhaust conduit at a muffler coupled thereto and operating at a back pressure ranging up to 62 inches of water at the rated power, wherein the muffler has a size selected to achieve a volume ratio, VR, which is a volume of the muffler divided by a cylinder displacement, ranging from about 3 upward.

48. The internal combustion engine of claim 47, wherein the first valve assembly is implemented within the blower housing.

49. The internal combustion engine of claim 48, wherein the one or more engine components include a cylinder, an intake manifold, and a throttle.

50. The internal combustion engine of claim 47, wherein the first air flows through the secondary air conduit at a rate of 60 to 120 liters per minute at a pressure differential of 300 millimeters of water, wherein the secondary air conduit has a length of greater than 0 to about 550 millimeters, and wherein the secondary air conduit has an internal diameter of about 9.5 to about 13 millimeters.

51. The internal combustion engine of claim 50, wherein the back pressure is a function of the volume ratio according to the formula BP=5.7 VR+5 wherein the BP is the back pressure at a related power.

52. The internal combustion engine of claim 51, wherein the engine has a displacement of less than 1 liter.

53. The internal combustion engine of claim 47, further comprising a second valve assembly linked directly with an intake conduit that is coupled to the cylinder such that an additional pressure within the intake conduit is applied to the second valve assembly, and wherein the second valve assembly at least partially governs the flow of the first air through the secondary air conduit based upon the additional pressure.

54. The internal combustion engine of claim 53, wherein the second valve assembly is connected to the intake conduit by way of a vacuum line, and wherein the second valve assembly includes a spring-biased actuator and a vacuum chamber.

55. The internal combustion engine of claim 47, wherein the one way valve is the reed valve, wherein a reed of the reed valve has a thickness ranging from about 0.05 millimeters to about 0.3 millimeters, wherein the reed has a length ranging from about 20 millimeters to about 50 millimeters, and wherein the reed has a width ranging from about 10 millimeters to about 20 millimeters.

* * * * *